US011928381B2

(12) United States Patent
Baijal et al.

(10) Patent No.: US 11,928,381 B2
(45) Date of Patent: Mar. 12, 2024

(54) DISPLAY DEVICE AND OPERATING METHOD THEREOF

(71) Applicant: SAMSUNG ELECTRONICS CO., LTD., Suwon-si (KR)

(72) Inventors: Anant Baijal, Suwon-si (KR); Cheulhee Hahm, Suwon-si (KR); Jayoon Koo, Suwon-si (KR); Seungwon Cha, Suwon-si (KR); Namuk Kim, Suwon-si (KR); Wookhyung Kim, Suwon-si (KR); Minki Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/835,702

(22) Filed: Jun. 8, 2022

(65) Prior Publication Data
US 2022/0300236 A1 Sep. 22, 2022

Related U.S. Application Data

(63) Continuation of application No. PCT/KR2021/002621, filed on Mar. 3, 2021.

(30) Foreign Application Priority Data

Feb. 23, 2021 (KR) .................... 10-2021-0024230

(51) Int. Cl.
*G06F 3/14* (2006.01)
*G06F 3/01* (2006.01)
(52) U.S. Cl.
CPC ............ *G06F 3/1423* (2013.01); *G06F 3/011* (2013.01)

(58) Field of Classification Search
CPC .......... G06F 3/013; G06F 3/011; G06F 3/017
See application file for complete search history.

(56) References Cited

U.S. PATENT DOCUMENTS 9,480,907 B2 11/2016 Benko et al.
10,004,984 B2 6/2018 Voris et al.
(Continued)

FOREIGN PATENT DOCUMENTS

JP 6371560 B2 8/2018
JP 2020-533695 A 11/2020
(Continued)

OTHER PUBLICATIONS

International Search Report & Written Opinion (PCT/ISA/210, PCT/ISA/237) dated Nov. 10, 2021 by the International Searching Authority in International Application No. PCT/KR2021/002621.
(Continued)

*Primary Examiner* — Nan-Ying Yang
(74) *Attorney, Agent, or Firm* — Sughrue Mion, PLLC

(57) ABSTRACT

Provided is a display device including a display configured to display first content; a memory storing instructions; and a processor configured to execute the instructions to: obtain first content information by analyzing the first content, obtain user tracking information by tracking a user viewing the first content displayed by the display, determine whether a trigger condition is satisfied, based on at least one of the first content information or the user tracking information, and based on the trigger condition being satisfied, control a communication unit to transmit second content to a projector connected to the display device, wherein the second content is generated based on the first content.

15 Claims, 23 Drawing Sheets

(56) References Cited

U.S. PATENT DOCUMENTS

| | | | |
|---|---|---|---|
| 10,015,739 B2 | 7/2018 | Yoon et al. | |
| 10,780,350 B2 | 9/2020 | Taylor et al. | |
| 2015/0332507 A1* | 11/2015 | Monaghan | H04N 9/3188 345/633 |
| 2016/0150472 A1 | 5/2016 | Yoon et al. | |
| 2017/0038912 A1* | 2/2017 | Nishida | G06F 3/0425 |
| 2018/0048874 A1* | 2/2018 | Esrail | H04N 23/698 |
| 2018/0118091 A1 | 5/2018 | Wymore et al. | |
| 2020/0353342 A1* | 11/2020 | Konrad | A63B 71/0622 |

FOREIGN PATENT DOCUMENTS

| | | |
|---|---|---|
| KR | 10-2015-0046594 A | 4/2015 |
| KR | 10-1542386 B1 | 8/2015 |
| KR | 10-1612196 B1 | 4/2016 |
| KR | 10-2016-0060972 A | 5/2016 |
| KR | 10-1715937 B1 | 3/2017 |
| KR | 10-2018-0097031 A | 8/2018 |

OTHER PUBLICATIONS

Samsung, "130" Class The Premiere LSP9T 4K Smart Triple Laser Projector", 2022, Samsung Electronics Co., Ltd., 33 pages total, https://www.samsung.com/us/televisions-home-theater/tvs/4k-laser-projectors/130-the-premiere-4k-uhd-hdr-smart-tv-2020-sp-lsp9tfaxza/.

Indiegogo, "Gazer Projector: 360-Degree Visual Experience-800 ANSI Lumens| 360° Rotatable| Up to 240" | 1080P | Truly Immersive Experience at Unbeatable Value", 2022 Indiegogo, 35 pages total, https://www.indiegogo.com/projects/gazer-projector-360-degree-visual-experience#/.

* cited by examiner

DISPLAY DEVICE AND OPERATING METHOD THEREOF

CROSS-REFERENCE TO RELATED APPLICATION(S)

This application is a by-pass continuation of International Application No. PCT/KR2021/002621, filed on Mar. 3, 2021, which is based on and claims priority to Korean Application No. 10-2021-0024230, filed on Feb. 23, 2021 in the Korean Intellectual Property Office, the entire disclosures of which are incorporated by reference herein in their entireties.

BACKGROUND

1. Field

The disclosure relates to a display device and an operating method thereof, and more particularly, to a display device that displays first content and controls outputting of second content by using a projector connected to the display device, and an operating method of the display device.

2. Description of Related Art

A projector, as one type of projection device, is an electronic device capable of enlarging and projecting a photo, a picture, a character, etc., on a slide or tracing paper onto a screen through a lens. Recently, the projector may output an image or a moving image of a file type as an image to the screen. That is, the projector may output the image to show the output image to many people. Types of projectors may be mainly divided into a cathode ray tube (CRT) projector, a liquid crystal display (LCD) projector, and a digital light source processing (DLP) projector, according to a technique of generating an image.

Such a projector is mainly used to display input multimedia content, but with the development of a wired/wireless communication network, the projector may be connected to a display device such as a digital television (TV) to assist the display device.

SUMMARY

Provided are a display device that displays first content and controls outputting of second content related to the first content through a projector connected to the display device, and an operating method of the display device.

Additional aspects will be set forth in part in the description which follows and, in part, will be apparent from the description, or may be learned by practice of the presented example embodiments.

According to an aspect of the disclosure, a display device includes: a display configured to display first content; a memory storing instructions; and a processor configured to execute the instructions to: obtain first content information by analyzing the first content, obtain user tracking information by tracking a user viewing the first content displayed by the display, determine whether a trigger condition is satisfied, based on at least one of the first content information or the user tracking information, and based on the trigger condition being satisfied, control a communication unit to transmit second content to a projector connected to the display device, wherein the second content is generated based on the first content.

The processor may be further configured to execute the instructions to, based on the trigger condition being satisfied, control the communication unit to transmit a trigger signal to the projector, and the trigger signal may include a first signal for powering on the projector or a second signal for switching the projector to an active state.

The user tracking information may include at least one of a number of users, a posture of the user, a position of the user, or a gaze direction of the user.

The processor may be further configured to execute the instructions to: determine projection angle information of the second content based on the user tracking information; and control the communication unit to transmit the projection angle information to the projector.

The projector may be configured to be rotatable by 360 degrees.

The processor may be further configured to execute the instructions to generate the second content by: performing at least one of extracting, copying, modifying, or composing at least partial content included in the first content, or recommending content related to the first content as the second content.

The first content information may include at least one of type information of the first content, genre information of the first content, object information included in the first content, or metadata regarding the first content.

The display device may further include a camera, and the processor may be further configured to execute the instructions to control the camera to track the user.

The processor may be further configured to execute the instructions to: obtain screen configuration information of the display, the screen configuration information of the display including at least one of brightness information, resolution information, size information, color information, or contrast information of the display; determine screen configuration information of the projector based on the screen configuration information of the display; and control the communication unit to transmit the screen configuration information of the projector to the projector.

The second content may be projected based on the screen configuration information of the projector.

According to an aspect of the disclosure a method of operating a display device includes: displaying first content; obtaining first content information by analyzing the first content; obtaining user tracking information by tracking a user viewing the first content that is displayed; determining whether a trigger condition is satisfied, based on at least one of the first content information or the user tracking information; and based on the trigger condition being satisfied, transmitting second content generated to a projector connected to the display device, wherein the second content is generated based on the first content.

The operating method may further include transmitting a trigger signal to the projector based on the trigger condition being satisfied, wherein the trigger signal may include a signal for powering on the projector or a signal for switching the projector to an active state.

The obtaining of the user tracking information may include obtaining at least one of a number of users, a posture of the user, a position of the user, or a gaze direction of the user, by tracking the user viewing the first content.

The method may further include: determining projection angle information of the second content based on the user tracking information; and transmitting the projection angle information to the projector.

According to an aspect of the disclosure, there is provided a non-transitory computer-readable storage medium storing instructions that are executable by a processor to perform a method of operating a display, the method including: displaying first content; obtaining first content information by analyzing the first content; obtaining user tracking information by tracking a user viewing the first content that is displayed; determining whether a trigger condition is satisfied, based on at least one of the first content information or the user tracking information; and based on the trigger condition being satisfied, transmitting second content generated to a projector connected to the display device, wherein the second content is generated based on the first content.

The method may further include based on the trigger condition being satisfied, transmitting a trigger signal to the projector, and wherein the trigger signal comprises a first signal for powering on the projector or a second signal for switching the projector to an active state.

The obtaining of the user tracking information may include obtaining at least one of a number of users, a posture of the user, a position of the user, or a gaze direction of the user, by tracking the user viewing the first content.

The method may further include: determining projection angle information of the second content based on the user tracking information; and transmitting the projection angle information to the projector.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
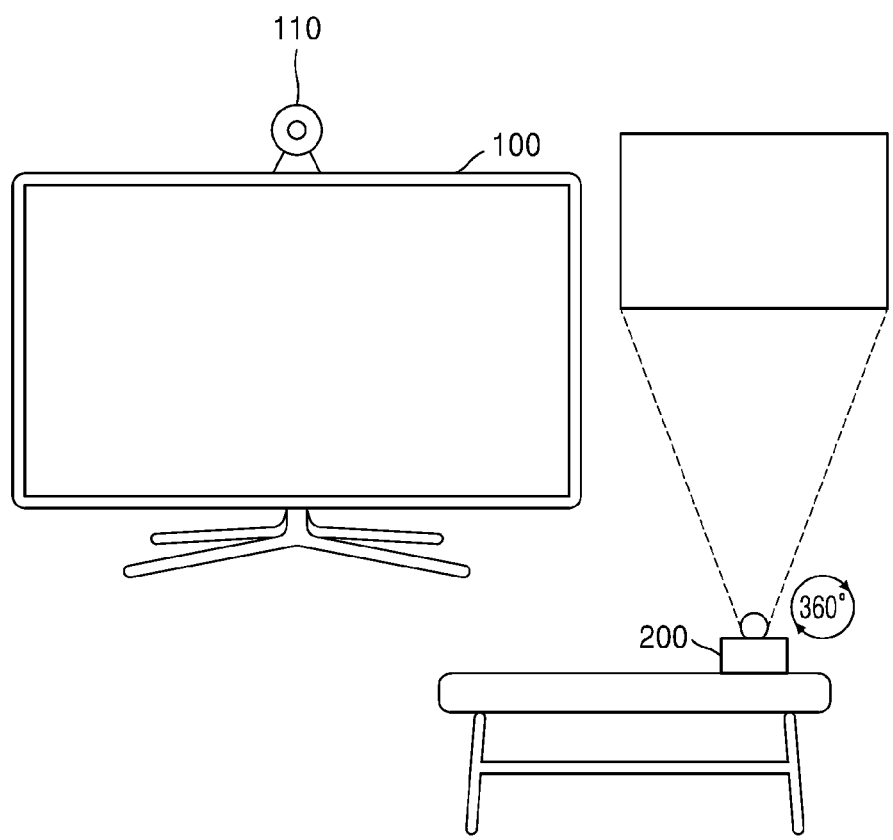
FIG. 1 is a diagram illustrating a method, performed by a display device and a projector connected thereto, of providing content, according to an embodiment.

Terms used herein will be described in brief, and the disclosure will be described in detail.

Although terms used in the disclosure are selected with general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms may be disclosed in a corresponding description part of the disclosure. Therefore, the terms used in the disclosure should be defined not by the simple names of the terms but by the meaning of the terms and the contents throughout the disclosure.

Throughout the entirety of the specification of the disclosure, when it is assumed that a certain part includes a certain component, the term 'including' means that a corresponding component may further include other components unless specially described to the contrary. The term used herein such as "unit" or "module" indicates a unit for processing at least one function or operation, and may be implemented in hardware, software, or in a combination of hardware and software.

Hereinafter, embodiments of the disclosure will be described in detail with reference to the attached drawings to allow those of ordinary skill in the art to easily carry out the embodiments of the disclosure. However, the disclosure may be implemented in various different forms, and are not limited to the embodiments of the disclosure described herein. To clearly describe the disclosure, parts that are not associated with the description have been omitted from the drawings, and throughout the specification, identical reference numerals refer to identical parts.

In an embodiment of the specification, the term "user" means a person who controls a function or an operation of a system, and may include a developer, a manager, or an installation engineer.

FIG. 1 is a diagram illustrating a method, performed by a display device and a projector connected thereto, of providing content, according to an embodiment.

A display device 100 according to an embodiment may be a television (TV), but is not limited to thereto and may be implemented in various forms including a display. For example, the display device 100 may be implemented with various electronic devices such as a cellular phone, a tablet personal computer (PC), a digital camera, a camcorder, a laptop computer, a tablet PC, a desktop, an electronic (e)-book terminal, a digital broadcasting terminal, a personal digital assistant (PDA), a portable multimedia player (PMP), a navigator, an MP3 player, a wearable device, and so forth. In particular, embodiments may be easily implemented in, but not limited to, a display device having a large-size display such as a signage or a TV. The display device 100 may be of a stationary type or a mobile type, and may be a digital broadcasting receiver capable of receiving digital broadcasting.

The display device 100 may be implemented with not only a flat display device, but also a curved display device provided with a screen having a curvature or a flexible display device having an adjustable curvature. An output resolution of the display device 100 may include, for example, high definition (HD), full HD, ultra HD, or a higher resolution than ultra HD.

The term "user" may refer to a person who controls a function or an operation of the display device 100. Alternatively, the user may include a viewer who watches content displayed on the display device 100 and include a manager or an installation engineer.

The term "content" may refer to multimedia content and include, but not limited to, images, video, audio, texts, applications, and the like.

The display device 100 according to an embodiment may display first content on a display.

The display device 100 may obtain information about the first content (or first content information) by analyzing the first content and obtain user tracking information by tracking the user watching the first content using a camera 110.

The display device 100 may determine whether a preset condition is satisfied, based on at least one of the information about the first content or the user tracking information. The display device 100 may transmit a trigger signal to a projector 200 when a preset trigger condition is satisfied.

The projector 200 according to an embodiment may be included (mounted or embedded) in the display device 100 or arranged separately from the display device 100 and may be wirelessly or wiredly connected to the display device 100.

The projector 200 according to an embodiment may include various form factors. For example, the projector 200 may have the form of a lamp placed on a table, etc., and the form of an electric bulb attachable to an electric bulb socket. However, embodiments are not limited thereto.

The projector 200 may be powered on when the projector 200 receives the trigger signal from the display device 100. Alternatively, the projector 200 may be in an idle mode state (an inactive state) and may be switched to a normal mode state (an active state) when the projector 200 receives the trigger signal from the display device 100. However, embodiments are not limited thereto.

The display device 100 according to an embodiment may generate second content based on the first content. For example, the display device 100 may generate the second content by composing, extracting, modifying, copying, etc., at least a part of the first content. Alternatively, the display device 100 may recommend another content that is different from the first content as the second content. However, the disclosure is not limited thereto.

The display device 100 may transmit the second content to the projector 200.

The projector 200 may output the second content received from the display device 100. The projector 200 according to an embodiment may output the second content to a projector including an image output unit that is rotatable by 360 degrees, in a 360-degree direction, and a projection angle thereof may be adjusted to display the second content in a predetermined region.

According to an embodiment, the projector 200 may maintain a state of being wirelessly or wiredly connected to the display device 100.

The display device 100 according to an embodiment may obtain user tracking information by performing user tracking, and may control a projection angle based on the user tracking information. This will be described in detail with reference to FIG. 4.

As shown in FIG. 1, by using the display device 100 according to an embodiment and the projector 200 together, the first content and the second content are provided, thereby improving a user's screen experience and enhancing projector's usability.

A system that provides the first content and the second content by using the display device 100 according to an embodiment and the projector 200 connected to the display device 100 may be referred to as a Screen Pro, according to an embodiment.

Hereinafter, with reference to the drawings, a method, performed by the display device 100 according to an embodiment and the projector 200 connected thereto, of providing content will be described in detail.

Figure 2:
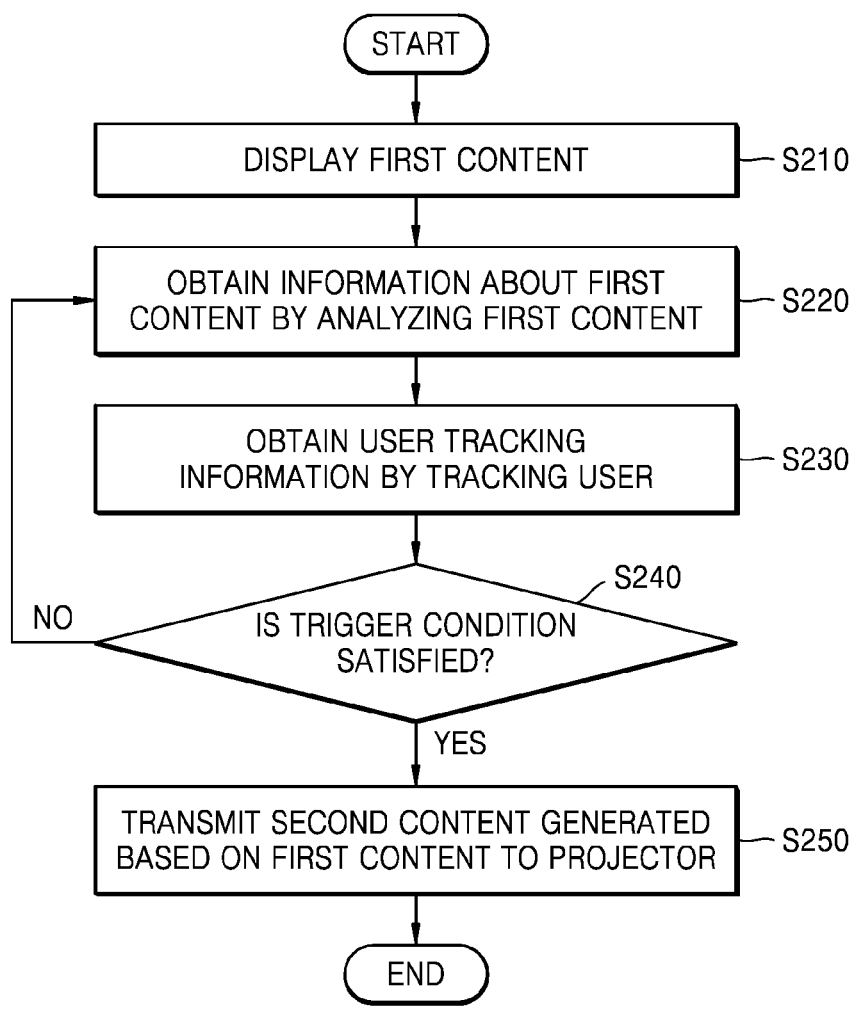
FIG. 2 is a flowchart of an operating method of a display device according to an embodiment.

FIG. 2 is a flowchart of an operating method of a display device according to an example embodiment.

Referring to FIG. 2, the display device 100 according to an embodiment may display first content in operation S210. In this case, the first content may include an image, video, a text, an application, audio, etc. However, the disclosure is not limited thereto.

The display device 100 according to an embodiment may obtain information about the first content by analyzing the first content, in operation S220. For example, the display device 100 may analyze the first content by using an artificial intelligence (AI) model. In this case, the AI model may be a model including one or more neural networks, and when the first content is input to the AI model, the AI model may output the information about the first content.

The information about the first content according to an embodiment may include one or more of type information of the first content, genre information of the first content, object information included in the first content, metadata regarding the first content, etc.

For example, the display device 100 may analyze which type of content among audio, video, an image, an application, and a text is included in the first content. The display device 100 may analyze the genre information of the first content according to a plot, a character, a theme, a screen composition, an atmosphere, etc., of the first content. For example, the genre of the first content may include sports, news, movies, an exercise, games, a conference call, online lectures, etc., but is not limited thereto. The genre of the first content may include one genre or a plurality of genres.

The display device 100 may obtain additional information of the first content, object information included in the first content, etc., by using the metadata of the first content.

The display device 100 according to an embodiment may include a camera or an image sensor or may be wiredly or wirelessly connected to the camera or the image sensor. The display device 100 may obtain the user tracking information by tracking the user using the camera or the image sensor, in operation S230. For example, the user tracking information may include at least one of the number of users, a user's posture, a user's position, or a user's gaze direction, but is not limited thereto.

The display device 100 according to an embodiment may determine whether a preset trigger condition is satisfied, based on at least one of the information about the first content or the user tracking information, in operation S240.

For example, the display device 100 may determine that the trigger condition is satisfied, when the first content is sports broadcasting content and a preset event (e.g., when a goal is scored in a soccer game or a home run is hit in a baseball game, etc.) occurs. Alternatively, the display device 100 may determine that the trigger condition is satisfied, when the first content is application content that instructs an exercise posture and the user takes the posture of looking at the floor. However, various trigger conditions may be preset without being limited to the example.

The display device 100 according to an embodiment may transmit the second content generated based on the first content to the projector, based on the trigger condition being satisfied, in operation S250.

For example, when the first content is a soccer game relay broadcast and a trigger condition is satisfied due to occurrence of an event of scoring a goal in the soccer game, then the display device 100 may extract a highlight scene of scoring the goal from the first content to generate the second content, and transmit the generated second content to the projector 200.

Alternatively, when the first content is application content that instructs an exercise posture and a trigger condition is satisfied as the user takes the posture of looking at the floor, then the display device 100 may generate the second content that is the same as the first content, and transmit the generated second content to the projector 200. In this case, the display device 100 may control a projection angle to display the second content in a gaze direction of the user.

Figure 3:
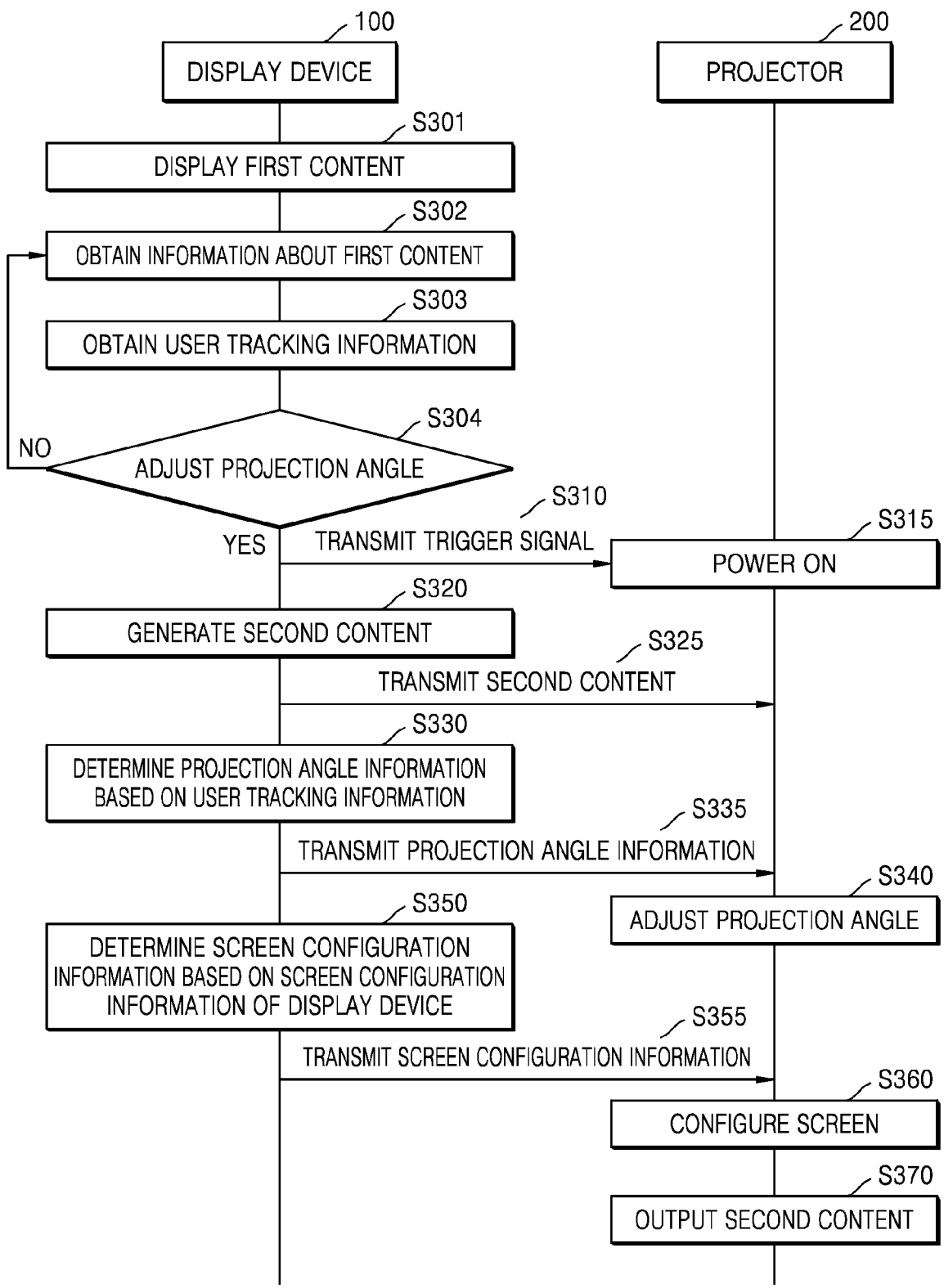
FIG. 3 is a flowchart of an operating method of a display system, according to an embodiment.

FIG. 3 is a flowchart of an operating method of a display system, according to an example embodiment.

Referring to FIG. 3, a display system according to an embodiment may include the display device 100 and the projector 200 connected to the display device 100.

Referring to FIG. 3, the display device 100 may display first content in operation S301 and obtain information about the first content by analyzing the first content in operation S302.

Operations S301 and S302 of FIG. 3 may correspond to operations S210 and S220 of FIG. 2, and thus a detailed description thereof will be omitted.

The display device 100 may obtain the user tracking information by tracking the user using the camera or the image sensor, in operation S303. Operation S303 of FIG. 3 may correspond to operation S230 of FIG. 2, and thus a detailed description thereof will be omitted.

The display device 100 according to an embodiment may determine whether a preset trigger condition is satisfied, based on at least one of the information about the first content or the user tracking information, in operation S304.

The display device 100 may transmit a trigger signal to the projector 200 when a preset trigger condition is satisfied, in operation S310.

By receiving the trigger signal from the display device 100, the projector 200 may be powered on or may be switched to a normal mode or an active state when the projector 200 is in an idle mode or an inactive state.

The display device 100 may generate the second content based on the first content. For example, the display device 100 may generate the second content by composing, extracting, modifying, copying, etc., at least a part of the first content. However, embodiments of the disclosure are not limited thereto.

The display device 100 may transmit the second content to the projector 200, in operation S325.

The display device 100 may determine projection angle information based on user tracking information, in operation S330.

For example, the display device 100 may determine a position of a region in which the second content is to be output, based on the number of users, a user's posture, a user's position, and a user's gaze direction, and determine a projection angle to output the second content in the region.

The display device 100 may transmit the position information or projection angle information of the region in which the second content is to be output, to the projector 200, in operation S335.

When the projector 200 receives the projection angle information from the display device 100, the projector 200 may adjust a projection angle based on the received projection angle information, in operation S340. Alternatively, when the projector 200 receives the position information of the region in which the second content is to be output, from the display device 100, the projector 200 may determine the projection angle based on the position information, and adjust the projection angle.

The display device 100 may determine screen configuration information of the projector 200 based on screen configuration information of the display device 100, in operation S350.

For example, the display device 100 may obtain first screen configuration information including at least one of brightness information, resolution information, size information, color information, or contrast information of the display. The display device 100 may determine second screen configuration information of the projector 200 based on the first screen configuration information of the display device 100.

The display device 100 may transmit the second screen configuration information to the projector 200 in operation S355, and the projector 200 may perform screen configuration of the projector 200 according to the received second screen configuration information in operation S360.

In operation S370, the projector 200 may output the second content based on the projection angle adjusted in operation S340 and the screen configuration information of operation S360.

Figure 4:
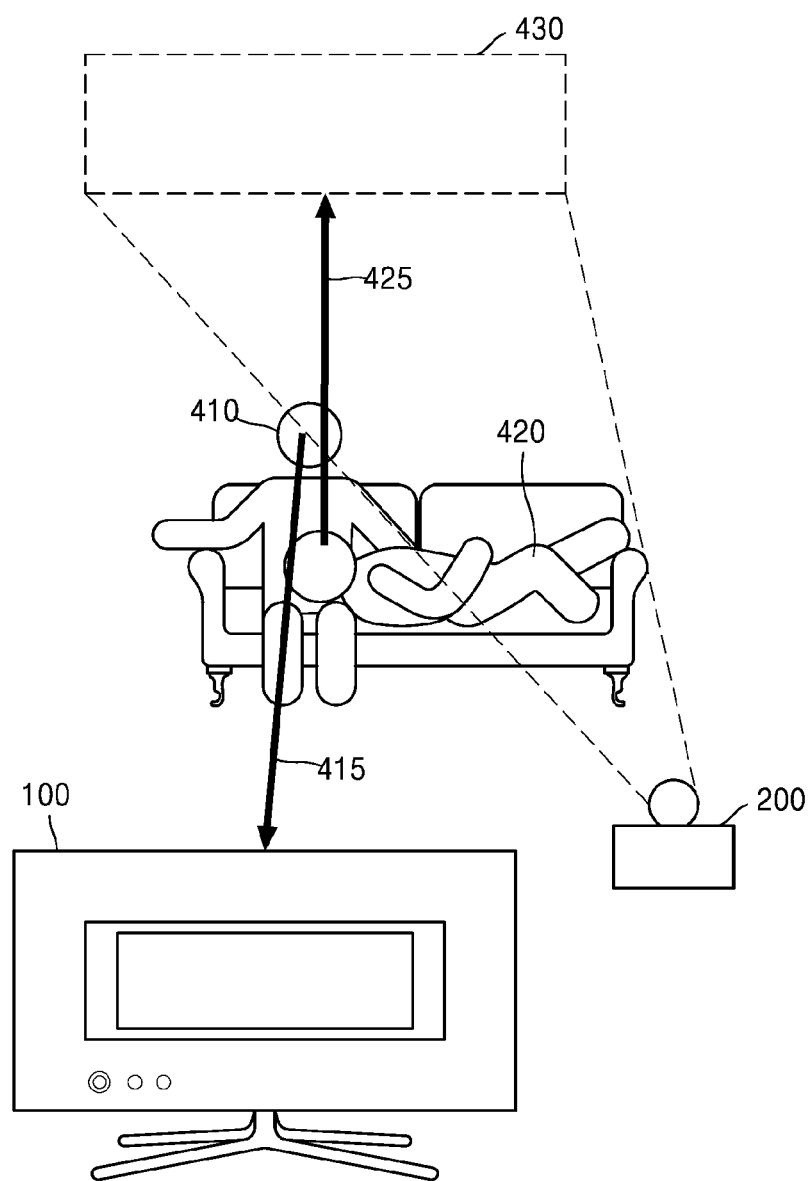
FIG. 4 is a diagram illustrating a method of adjusting a projection angle of a projector based on user tracking information, according to an example embodiment.

FIG. 4 is a diagram illustrating a method of adjusting a projection angle of a projector based on user tracking information, according to an example embodiment.

Referring to FIG. 4, the display device 100 may obtain the user tracking information by using the camera or the image sensor. For example, the user tracking information may include information about the number of users, a user's posture, a user's position, a user's gaze direction, etc.

For example, as shown in FIG. 4, by performing user tracking, the display device 100 may obtain information indicating that two users including a first user 410 and a second user 420 are present, a first gaze direction 415 of the first user 410 is a direction of facing the display device 100, and a second gaze direction 425 of the second user 420 is a direction of facing the ceiling.

Thus, the display device 100 may generate the second content that copies the first content displayed on the display device 100, and transmit the second content to the projector 200. The display device 100 may determine projection angle information based on the second gaze direction 425 of the second user 420 and transmit the projection angle information to the projector 200. The projector 200 according to an embodiment may output the second content to display the second content in a second region 430 located in the second gaze direction 425, by adjusting the projection angle based on the projection angle information.

Figure 5:
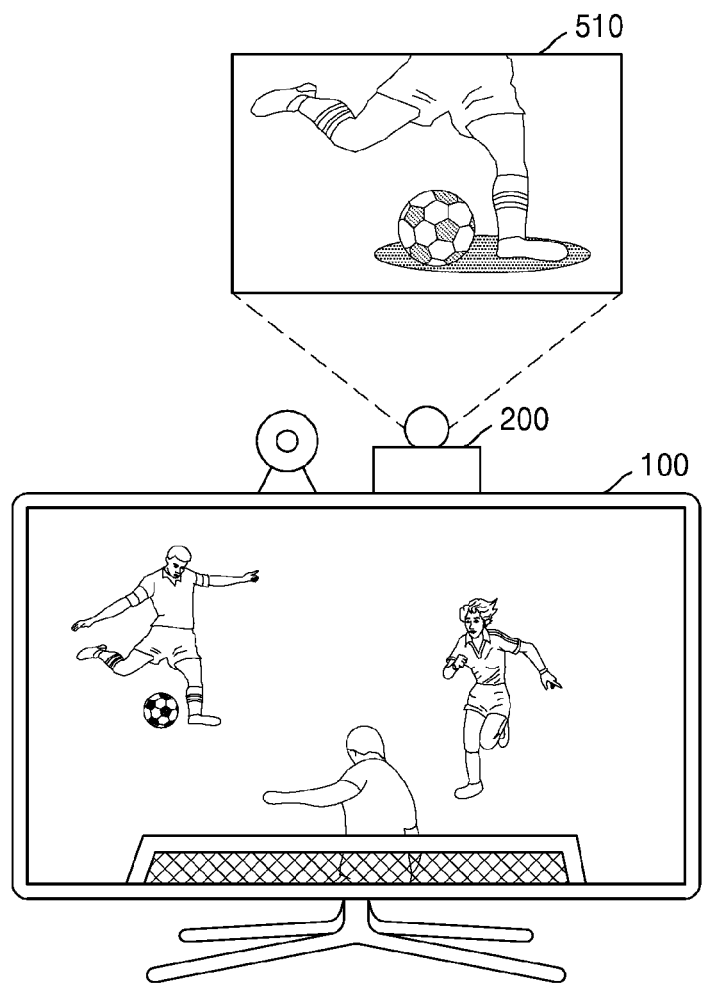
FIG. 5 is a diagram illustrating a method of providing second content when first content is sporting event broadcasting content, according to an embodiment.

FIG. 5 is a diagram illustrating a method of providing second content when first content is sporting event broadcasting content, according to an example embodiment.

Referring to FIG. 5, the display device 100 according to an embodiment may display broadcasting content that relays a sporting event. The display device 100 may obtain information indicating that the first content is broadcasting content that relays a sporting event, by analyzing the first content being currently played. In addition, the display device 100 may detect occurrence of a preset event from the first content. For example, the display device 100 may analyze video information included in the first content or analyze audio information included in the first content, thereby detecting an event of scoring a goal in a soccer game or hitting a home run in a baseball game.

The display device 100 may transmit a trigger signal to the projector 200 when a preset event occurs in the first content. Alternatively, when the display device 100 receives a user input to request the second content, the display device 100 may transmit the trigger signal to the projector 200.

By receiving the trigger signal, the projector 200 may be powered on or may be switched to the normal mode or the active state when the projector 200 is in the idle mode or the inactive state.

When the preset event occurs or the display device 100 receives a user input to request the second content, the display device 100 may generate the second content based on the first content. For example, the second content may include highlight scenes extracted from the first content, indicate information about an object included in the first content, or include scenes previous to a current play time of the first content. However, embodiments of the disclosure are not limited thereto.

The display device 100 may transmit the second content to the projector 200 that may output the second content received from the display device 100. When the projector 200 outputs the second content at a preset projection angle or receives the projection angle information from the display device 100, the projector 200 may adjust the projection angle based on the received projection angle information and output the second content at the adjusted projection angle. Thus, the second content may be displayed in a predetermined region 510 that is separate from the display of the display device 100, such that the user may watch the first content and the second content at the same time.

Figure 6A:
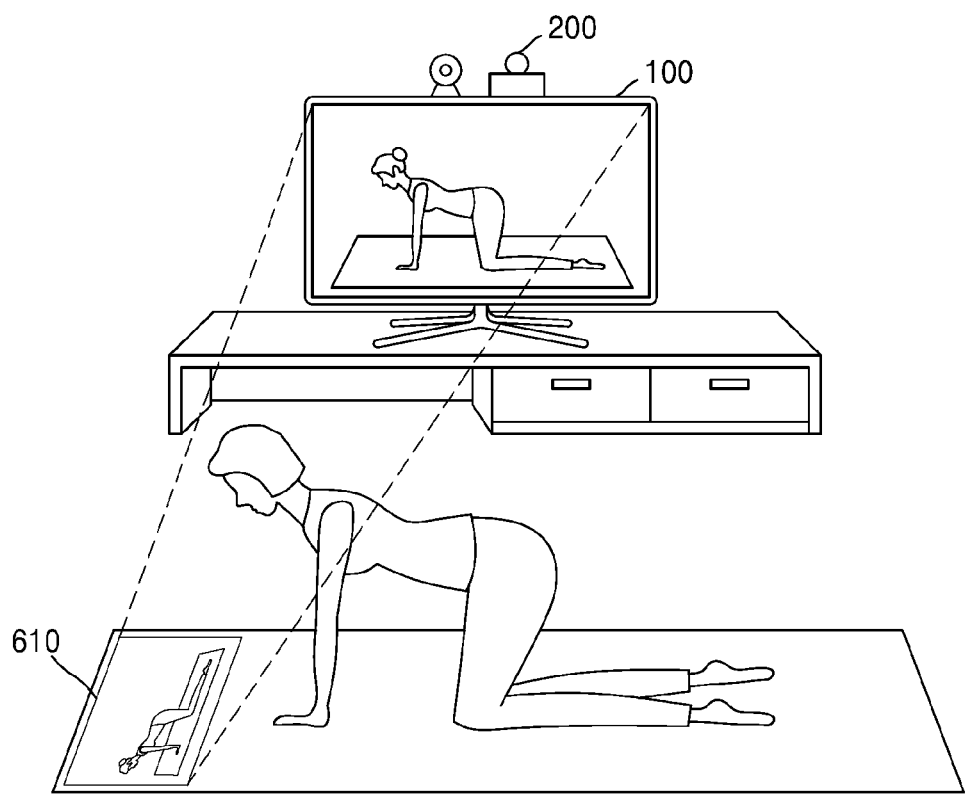
FIGS. 6A and 6B are diagrams illustrating a method of providing second content when first content is an exercise application, according to an embodiment.
Figure 6B:
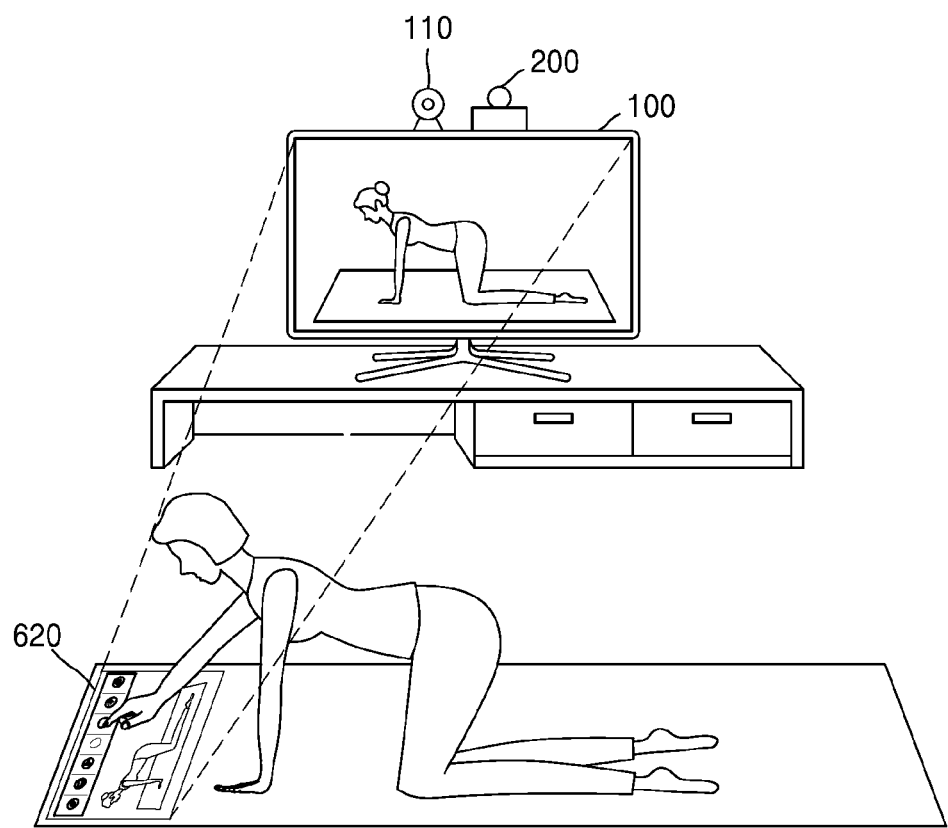

FIGS. 6A and 6B are diagrams illustrating a method of providing second content when first content is an exercise application, according to an example embodiment.

Referring to FIG. 6A, the display device 100 according to an embodiment may display an execution screen of an exercise application. By analyzing the currently executed exercise application, the display device 100 may obtain information indicating that the first content is the exercise application. Alternatively, the display device 100 may obtain information about a time when among postures instructed on an execution screen of the exercise application, a specific posture that makes it difficult for the user to look at the display is displayed.

Alternatively, the display device 100 may obtain position information and posture information of the user by performing user tracking, and may determine whether the user takes the specific posture that makes it difficult for the user to look at the display.

The display device 100 may determine whether the user is in a situation that makes it difficult for the user to look at the display, based on information about the exercise application or the position information and posture information of the user, and when the user is in such a situation, the display device 100 may transmit the trigger signal to the projector 200.

By receiving the trigger signal, the projector 200 may be powered on or may be switched to the normal mode or the active state when the projector 200 is in the idle mode or the inactive state.

When the user is in the situation that makes it difficult for the user to look at the display, the display device 100 may generate the same second content as the first content (e.g., the execution screen of the exercise application) and transmit the second content to the projector 200. For example, the second content may be content copied from the first content.

The display device 100 may determine a position of a region in which the second content is to be displayed, based on the position information and the posture information of the user, and determine projection angle information of the projector 200 for outputting the second content in the determined region. For example, when the user takes the posture of looking at the floor, the display device 100 may determine a display position of the second content as a floor 610 and determine the projection angle information to display the second content on the floor 610.

The display device 100 may transmit the position information or projection angle information of a determined projection region to the projector 200.

When the projector 200 receives the position information of the projection region from the display device 100, the projector 200 may determine a projection angle based on the received position information. The projector 200 may output the second content at the determined projection angle. Alternatively, when the projector 200 receives the projection angle information from the display device 100, the projector 200 may output the second content at the received projection angle.

Thus, as shown in FIG. 6A, when the user takes an exercise posture of looking at the floor 610, the user may easily follow the exercise posture while watching the second content displayed on the floor 610 without looking at the display of the display device 100.

In addition, referring to FIG. 6B, when the second content displayed on the floor 610 includes a menu screen 620, the user may select a menu item by using a gesture to touch one of a plurality of menu items included in the menu screen 620 with a finger of the user. The camera 110 may capture an image of the user's gesture and the display device 100 may recognize a finger gesture of the user based on the captured image. The display device 100 may perform an execution operation corresponding to the menu item touched by the recognized finger gesture.

Figure 7:
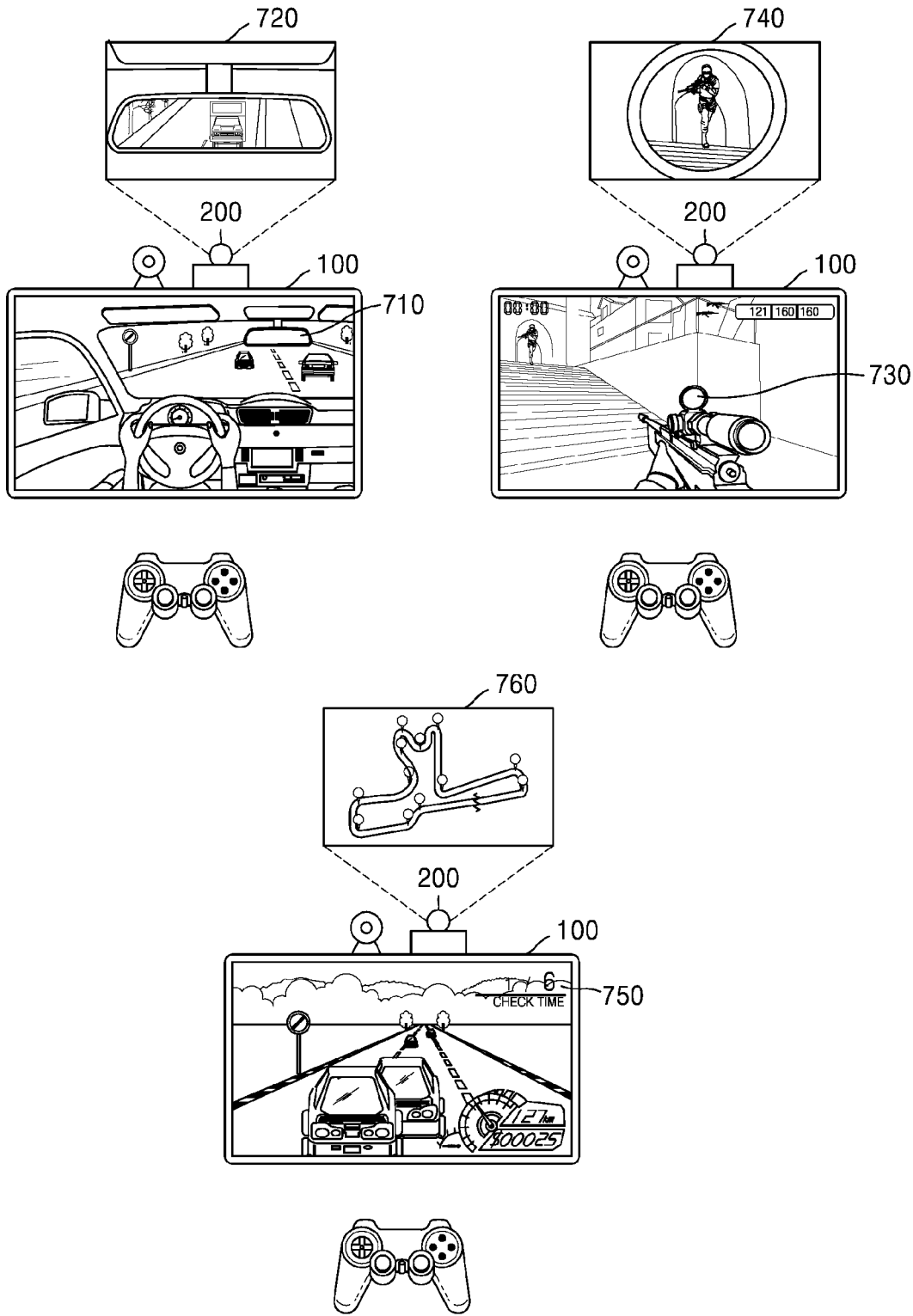
FIG. 7 is a diagram illustrating a method of providing second content when first content is game content, according to an embodiment.

FIG. 7 is a diagram illustrating a method of providing second content when first content is game content, according to an example embodiment.

Referring to FIG. 7, the display device 100 according to an embodiment may display an execution screen of game content. By analyzing the currently executed game content, the display device 100 may obtain information indicating that the first content is the game content. The display device 100 may also obtain additional information about the game content by analyzing metadata, etc., of the game content.

The display device 100 may transmit the trigger signal to the projector 200 when the additional information about the game content exists or a particular object included in the game content is selected.

By receiving the trigger signal, the projector 200 may be powered on or may be switched to the normal mode or the active state when the projector 200 is in the idle mode or the inactive state.

For example, when the game content (e.g., the first content) includes a rear mirror enlarged view image as the additional information or a user input to select a rear mirror 710 included in the game content is received, the display device 100 may transmit the trigger signal to the projector 200 and transmit the rear mirror enlarged view image (e.g., the second content) to the projector 200. The rear mirror enlarged view image (e.g., the second content) may be generated based on the game content (e.g., the first content) or may be included in meta information of the game content.

For example, when the game content (e.g., the first content) includes a gun aiming window enlarged view image as the additional information or a user input to select a gun aiming window 730 included in the game content is received, the display device 100 may transmit the trigger signal to the projector 200 and transmit the gun aiming window enlarged view image (e.g., the second content) to the projector 200. The gun aiming window enlarged view image (e.g., the second content) may be generated based on the game content (e.g., the first content) or may be included in meta information of the game content.

For example, when the game content (e.g., the first content) includes map information 750 as the additional information or a user input to select map information 750 is received, the display device 100 may transmit the trigger signal to the projector 200 and transmit the map information 750 (e.g., the second content) to the projector 200. The map information (e.g., the second content) may be generated based on the game content (e.g., the first content) or may be included in meta information of the game content.

The projector 200 may output the second content (e.g., a rear mirror enlarged image 720, a gun aiming window enlarged image 740, or map information 760) received from the display device 100 in a predetermined region. When the projector 200 outputs the second content at a preset projection angle or receives the projection angle information from the display device 100, the projector 200 may adjust the projection angle based on the received projection angle information and output the second content at the adjusted projection angle. Thus, the second content (e.g., the rear mirror enlarged image 720, the gun aiming window enlarged image 740, or the map information 760) may be displayed in a predetermined region separately from the display of the display device 100, such that the user may the game content while watching the first content (e.g., a game execution screen) and the second content (e.g., the rear mirror enlarged image 720, the gun aiming window enlarged image 740, or the map information 760) at the same time.

Figure 8A:
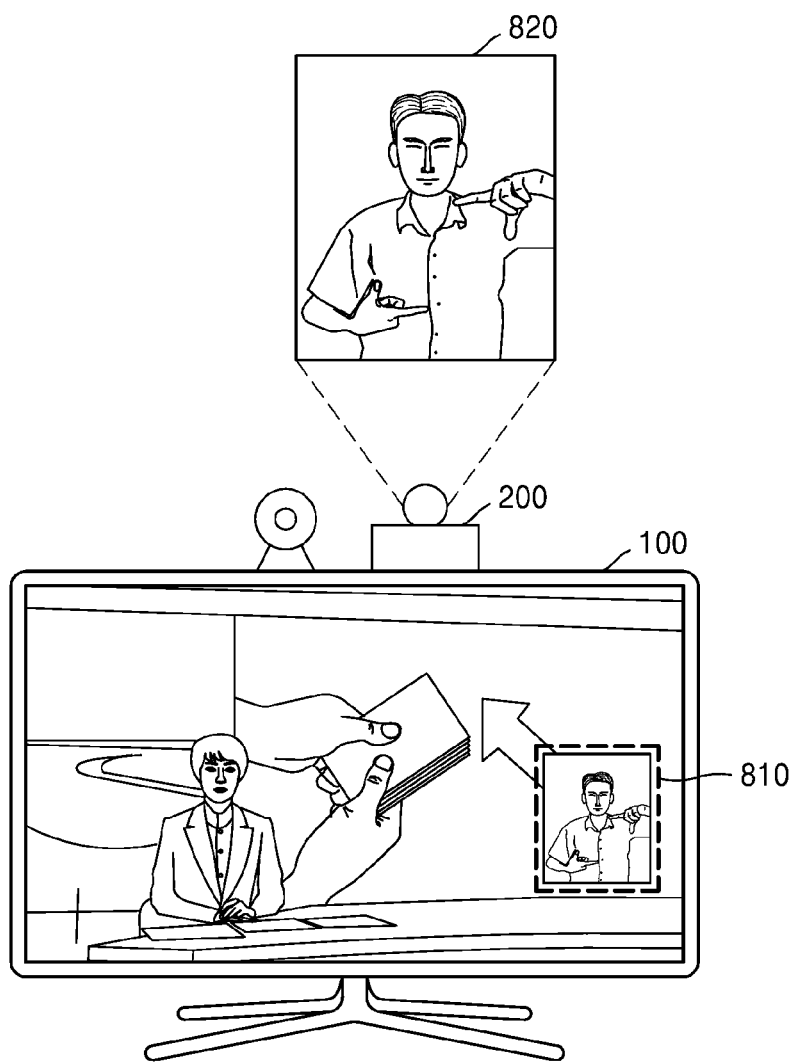
FIGS. 8A and 8B are diagrams illustrating a method of providing second content when first content is a newscast, according to an embodiment.
Figure 8B:
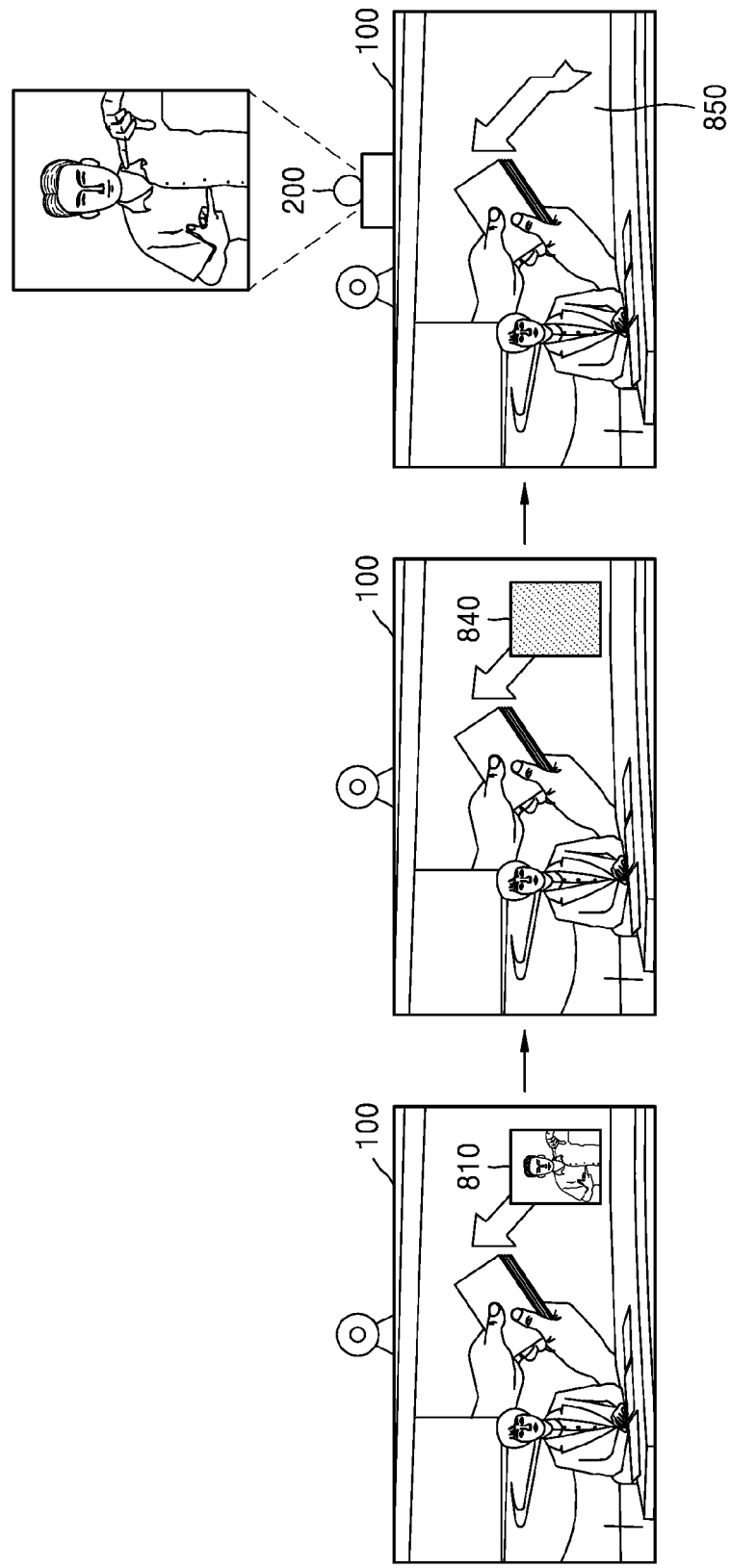

FIGS. 8A and 8B are diagrams illustrating a method of providing second content when first content is a newscast, according to an example embodiment.

Referring to FIGS. 8A and 8B, the display device 100 according to an embodiment may display a newscast screen. By analyzing the news broadcasting screen, the display device 100 may obtain information indicating that the first content is a newscast. By analyzing the newscast screen, the display device 100 may recognize a sign language interpreter included in the newscast screen.

The display device 100 may transmit the trigger signal to the projector 200 when the sign language interpreter is recognized.

By receiving the trigger signal, the projector 200 may be powered on or may be switched to the normal mode or the active state when the projector 200 is in the idle mode or the inactive state.

The display device 100 may extract a partial image 810 where the sign language interpreter is displayed from the newscast screen to generate the second content, and transmit the generated second content to the projector 200. The display device 100 may enlarge the partial image 810 where the sign language interpreter is displayed, and improve the quality of the enlarged image (e.g., the resolution of the image, the quality of the image, etc.), thus generating the second content.

The display device 100 may also transmit the position information or projection angle information of a determined projection region to the projector 200.

The projector 200 may output a sign language interpreter image (e.g., the second content) based on the position information or the projection angle information of the projection region.

As shown in FIG. 8A, a sign language interpreter image 810 displayed with a first size in a region of the display device 100 may be displayed in a predetermined region 820 with a second size larger than the first size separately from the display device 100. Thus, a user's viewing experience of sign language interpretation may be improved.

Referring to FIG. 8B, the display device 100 may remove the partial image 810 where the sign language interpreter is displayed from the newscast screen, and compose a newscast screen corresponding to an image-removed region 840 by using an image composition technique, etc., such that the sign language interpreter is not displayed on the newscast screen. Thus, a newscast screen 850 displayed on the display device 100 may not be obscured by the sign language interpreter, thereby improving a user's viewing experience.

Figure 9A:
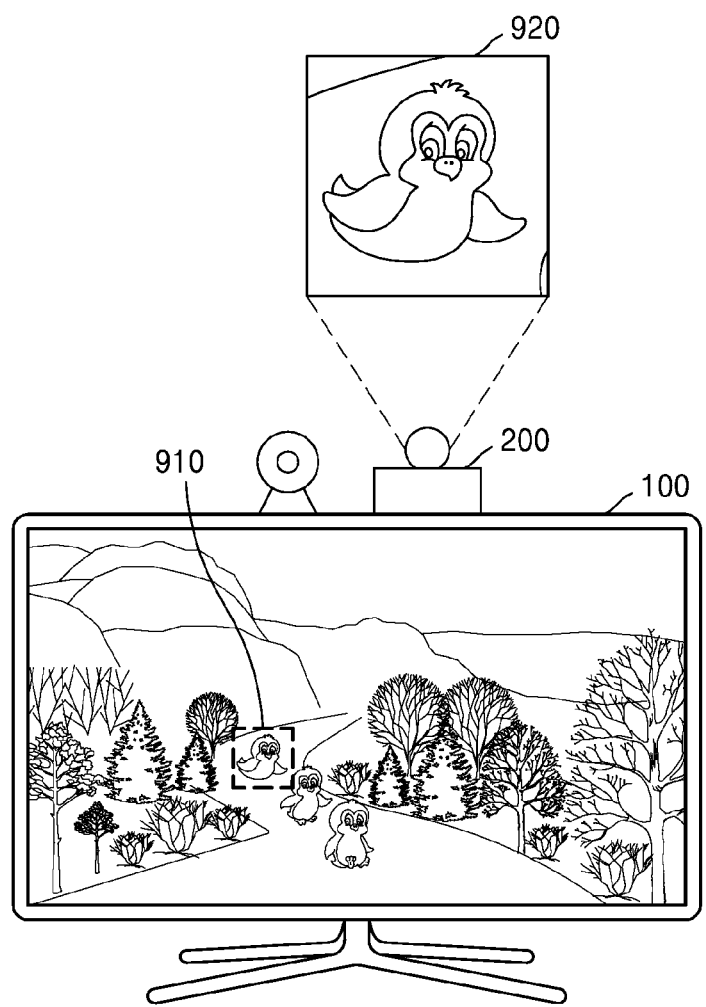
FIGS. 9A, 9B and 9C are diagrams illustrating a method of providing second content when first content is movie content, according to an embodiment.
Figure 9B:
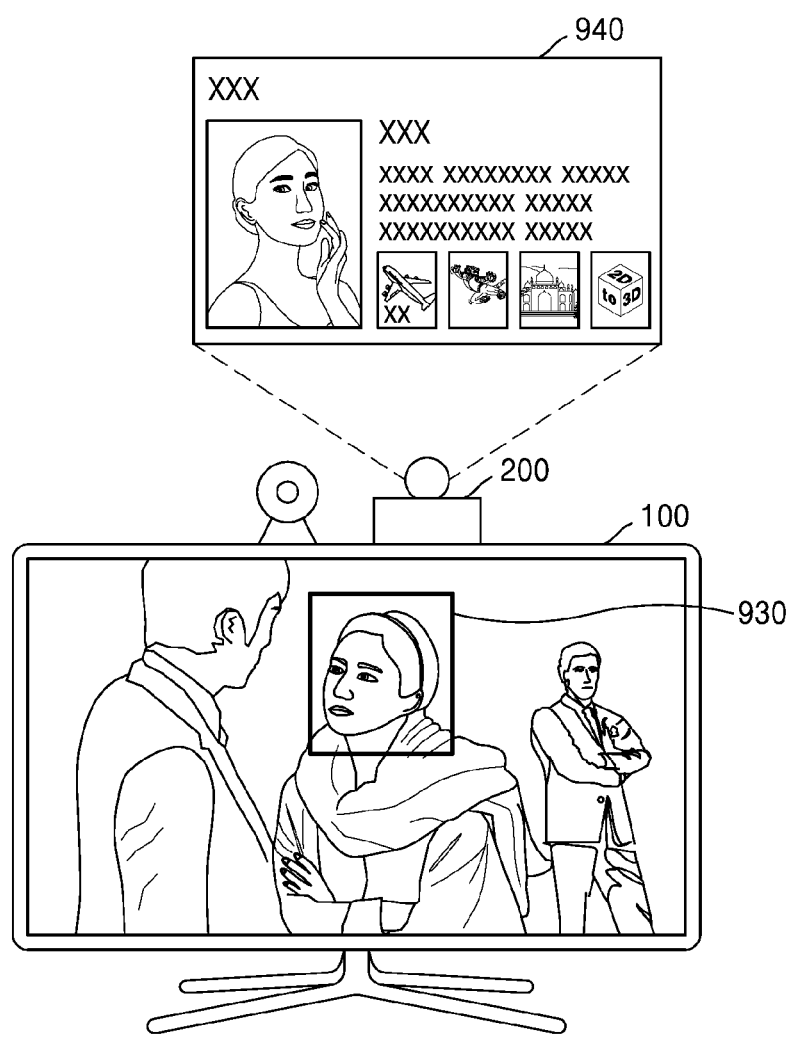
Figure 9C:
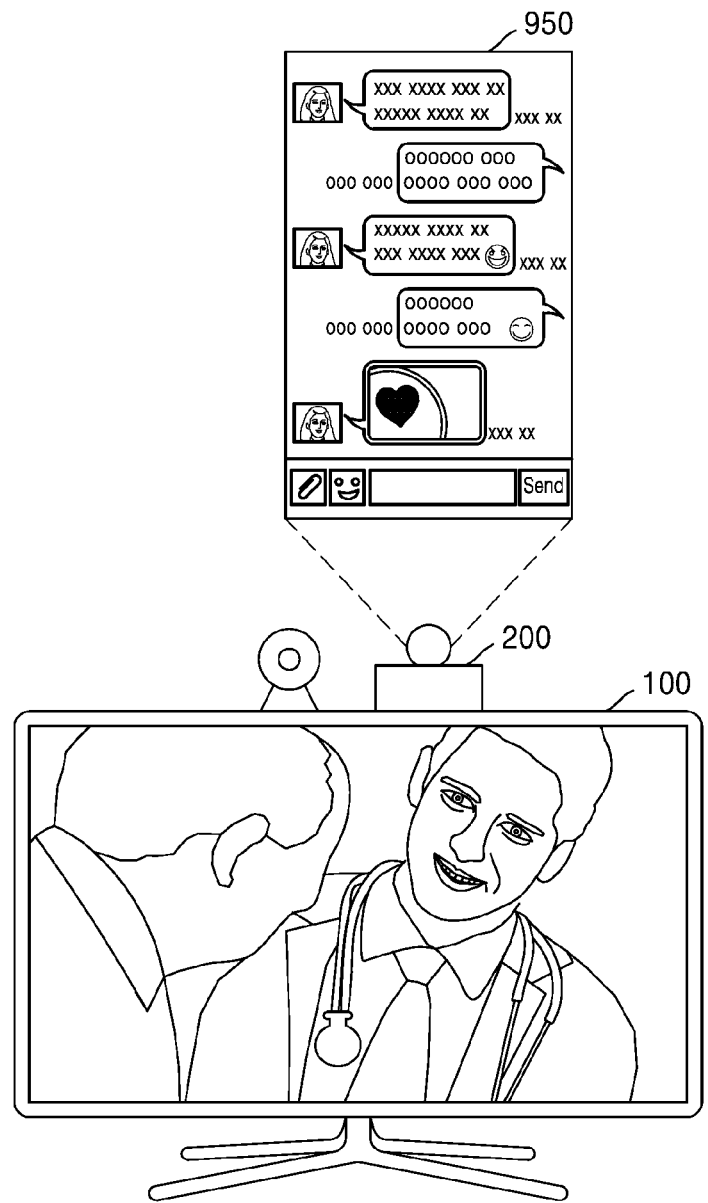

FIGS. 9A, 9B and 9C are diagrams illustrating a method of providing second content when first content is movie content, according to an example embodiment.

Referring to FIGS. 9A to 9C, the display device 100 according to an embodiment may display a playback screen of movie content. By analyzing the currently played movie content, the display device 100 may obtain information indicating that the first content is the movie content. The display device 100 may also obtain additional information about the movie content by analyzing metadata, etc., of the movie content.

Referring to FIG. 9A, when an actor or object 910 having a size less than or equal to a preset value is detected from the playback screen of the movie content or a user input to select the actor or object 910 from the playback screen is received, the display device 100 may transmit the trigger signal to the projector 200 and transmit an enlarged image (e.g., the second content) of the actor or object 910 to the projector 200.

The projector 200 may output the enlarged image (e.g., the second content) of the actor or object 910 received from the display device 100. When the projector 200 outputs the enlarged image of the actor or object 910 at a preset projection angle or receives the projection angle information from the display device 100, the projector 200 may adjust the projection angle based on the received projection angle information and output an enlarged image 920 of the actor or object 910 at the adjusted projection angle.

Referring to FIG. 9B, in the case that the movie content includes information related to an actor or object 930 included in the movie content, when an actor or object 930 is included in a movie playback screen or a user input to select the actor or object 930 included in the movie playback screen is received, the display device 100 may transmit the trigger signal to the projector 200 and transmit information (e.g., the second content) related to the actor or object 930 to the projector 200.

The projector 200 may output information 940 (e.g., the second content) related to the actor or object 930, received from the display device 100. When the projector 200 outputs the information 940 related to the actor or object 930 at a preset projection angle or receives the projection angle information from the display device 100, the projector 200 may adjust the projection angle based on the received projection angle information and output the information 940 related to the actor or object 930 at the adjusted projection angle.

Referring to FIG. 9C, when a user input to select a chatting application or 'chat' is received during display of the movie playback screen, the display device 100 may transmit the trigger signal to the projector 200 and transmit a chatting window screen 950 (e.g., the second content) to the projector 200. The projector 200 may output a chatting window screen 950 received from the display device 100.

Thus, the user may perform chatting related to the movie content in a region that is separate from the display while watching the movie content through the display of the display device 100.

Figure 10:
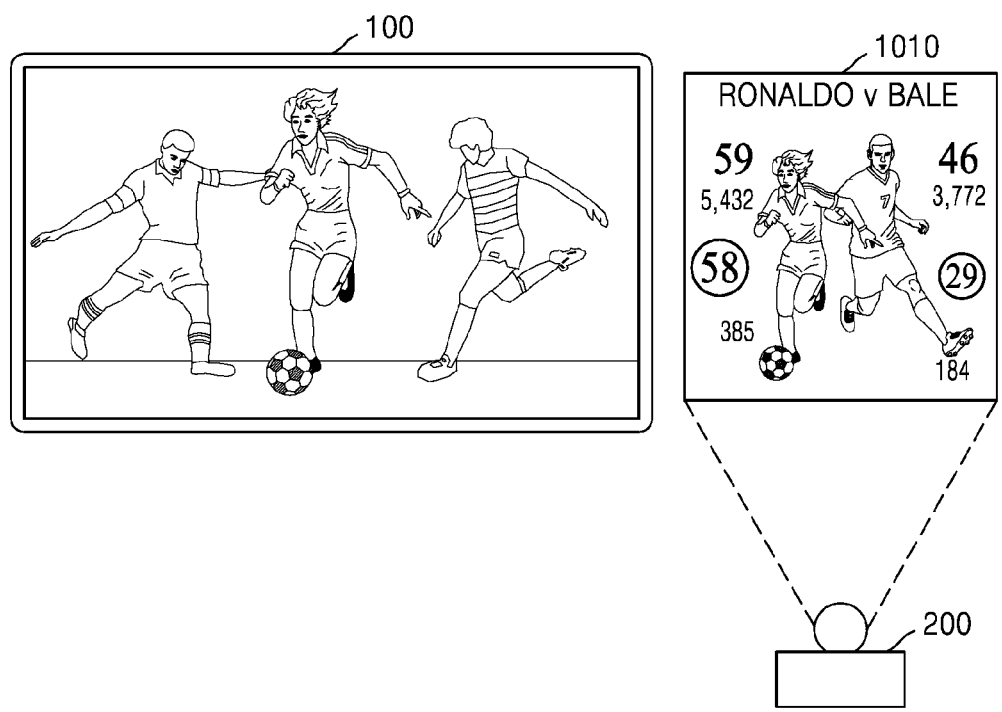
FIG. 10 is a diagram illustrating a method of providing second content when first content includes augmented reality (AR) content, according to an embodiment.

FIG. 10 is a diagram illustrating a method of providing second content when first content includes augmented reality (AR) content, according to an example embodiment.

Referring to FIG. 10, the display device 100 according to an embodiment may display first content including AR content. The display device 100 may obtain information indicating that the first content includes the AR content, by analyzing the first content.

When the AR content is detected from the currently played screen or a user input to request the AR content is received, the display device 100 may transmit the trigger signal to the projector 200 and transmit the AR content (e.g., the second content) to the projector 200.

The projector 200 may output AR content 1010 received from the display device 100 in a predetermined region.

Thus, the user may easily look at the AR content without directing a mobile device toward the display device 100 to view the AR content 1010.

Figure 11:
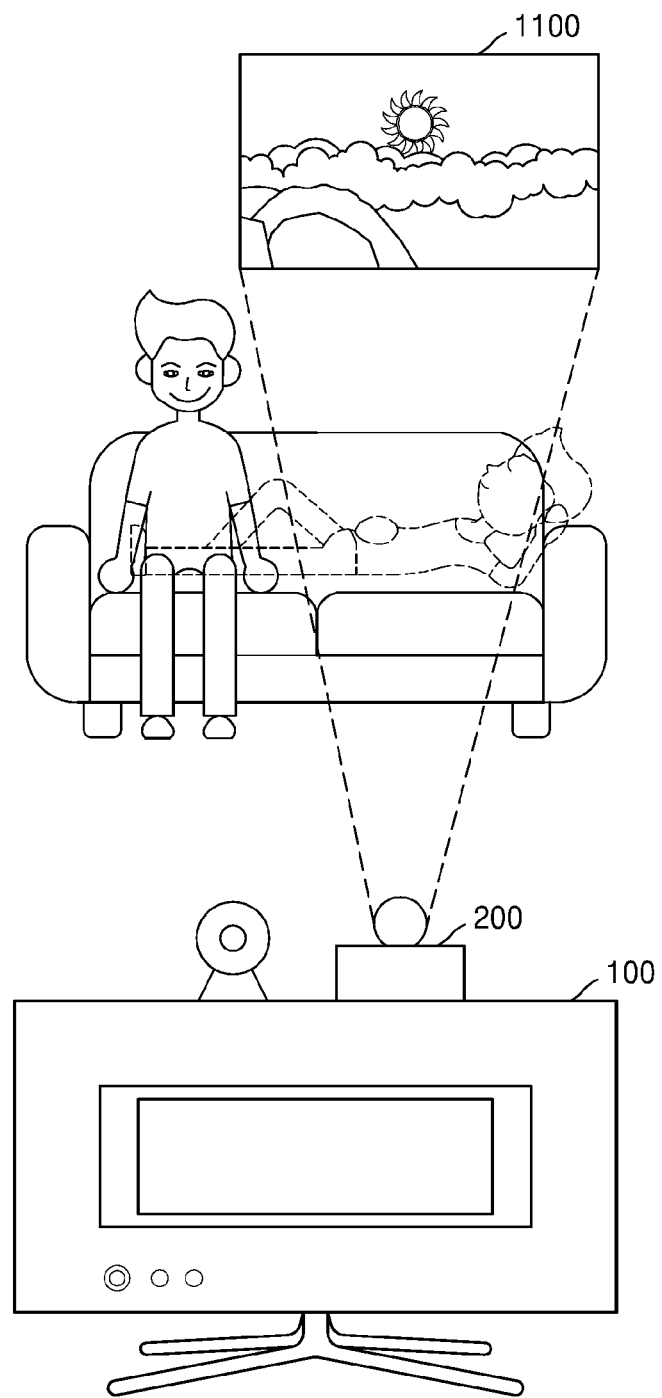
FIG. 11 is a diagram illustrating a method, performed by a display device, of providing content based on user tracking information, according to an embodiment.

FIG. 11 is a diagram illustrating a method, performed by a display device, of providing content based on user tracking information, according to an example embodiment.

Referring to FIG. 11, the display device 100 according to an embodiment may display first content. The display device 100 may obtain position information and posture information of the user by tracking the user watching the first content, using the camera or the image sensor. When the user having watched the first content displayed on the display, sitting on a sofa, changes the posture to the posture of lying on the sofa, looking at the ceiling, then the display device 100 may detect a change in the position and the posture of the user. When the position and the posture of the user cause the user to be unable to look at the display of the display device 100, the display device 100 may transmit the trigger signal to the projector 200.

By receiving the trigger signal, the projector 200 may be powered on or may be switched to the normal mode or the active state when the projector 200 is in the idle mode or the inactive state.

The display device 100 may generate the same second content as the first content, by copying the first content displayed on the display. The display device 100 may transmit the position information or projection angle information of a projection region, based on the position information and the posture information of the user.

The projector 200 may output second content 1110 received from the display device 100 in a predetermined region (e.g., the ceiling) based on the position information or the projection angle information of the projection region.

Figure 12:
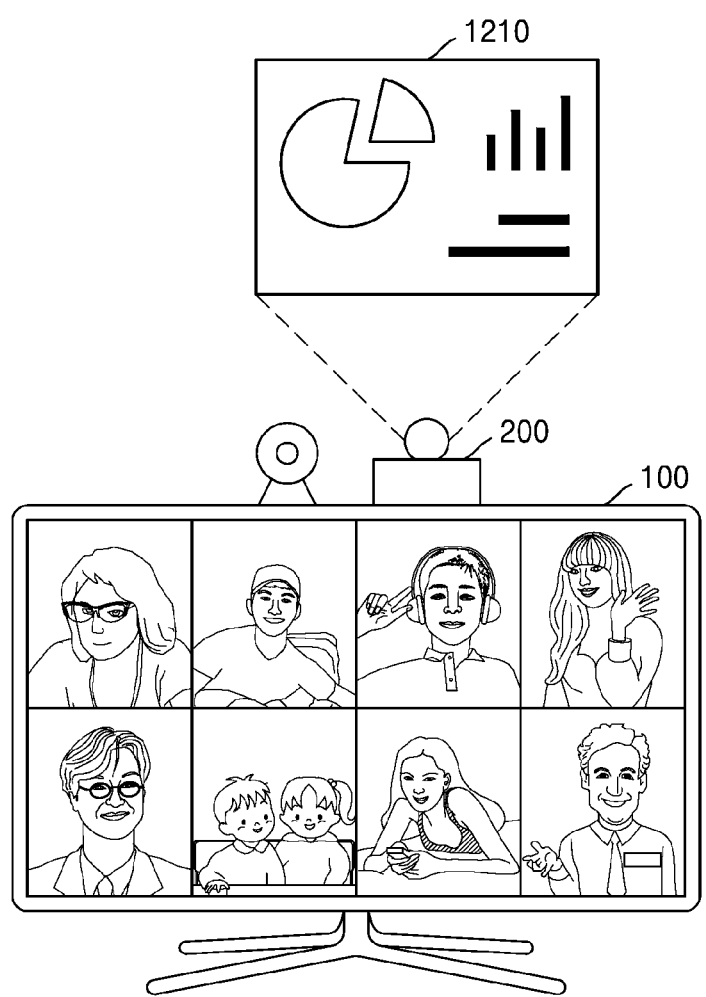
FIG. 12 is a diagram illustrating a method of providing second content when first content is a conference call, according to an example embodiment.

FIG. 12 is a diagram illustrating a method of providing second content when first content is a conference call, according to an example embodiment.

Referring to FIG. 12, the display device 100 according to an embodiment may display a conference call screen. By analyzing the currently displayed screen, the display device 100 may obtain information indicating that the first content is a conference call. For example, the display device 100 may recognize that the first content is the conference call, by analyzing a layout, audio, etc., of the screen. However, embodiments of the disclosure are not limited thereto.

When the display device 100 receives an input to share a document or material by someone among participants in the conference call, the display device 100 may transmit the trigger signal to the projector 200 and transmit the shared document or material (e.g., the second content) to the projector 200.

The projector 200 may output a shared document or material 1210 received from the display device 100 in a region that is separate from the display of the display device 100.

Thus, the user may view the shared document or material in a region that is separate from the display device while viewing images of the participants in the conference call without being disturbed by the shared document or material.

Figure 13:
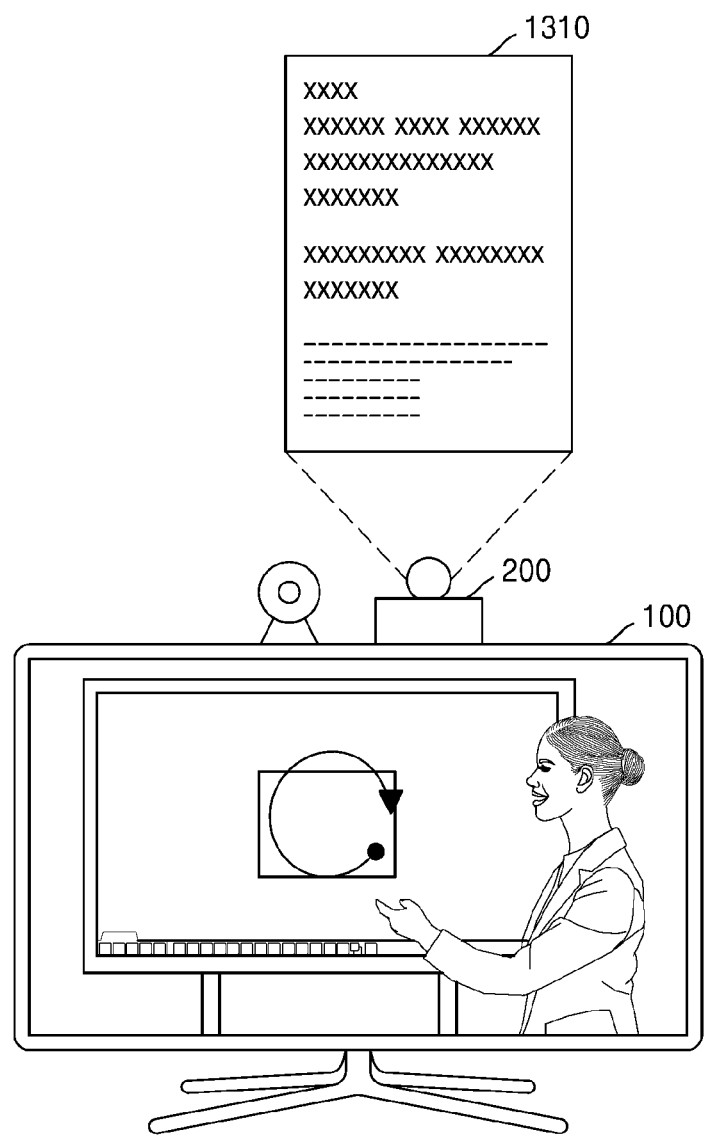
FIG. 13 is a diagram illustrating a method of providing second content when first content is online learning content, according to an embodiment.

FIG. 13 is a diagram illustrating a method of providing second content when first content is online learning content, according to an example embodiment.

Referring to FIG. 13, the display device 100 according to an embodiment may display an online lecture screen. By analyzing the currently displayed screen, the display device 100 may obtain information indicating that the first content is an online lecture. For example, the display device 100 may recognize that the first content is the online lecture, by analyzing a layout, audio, etc., of the screen. However, embodiments of the disclosure are not limited thereto.

When the online content includes an online lecture material, the display device 100 may transmit the trigger signal to the projector 200 and transmit the online lecture material (e.g., the second content) to the projector 200. The projector 200 may output an online lecture material 1310 received from the display device 100 in a region that is separate from the display of the display device 100.

Thus, the user may view the online lecture material 1310 in the region that is separate from the display device 100 while watching the online lecture through the entire screen of the display of the display device 100, without being disturbed by the online lecture material 1310.

Figure 14:
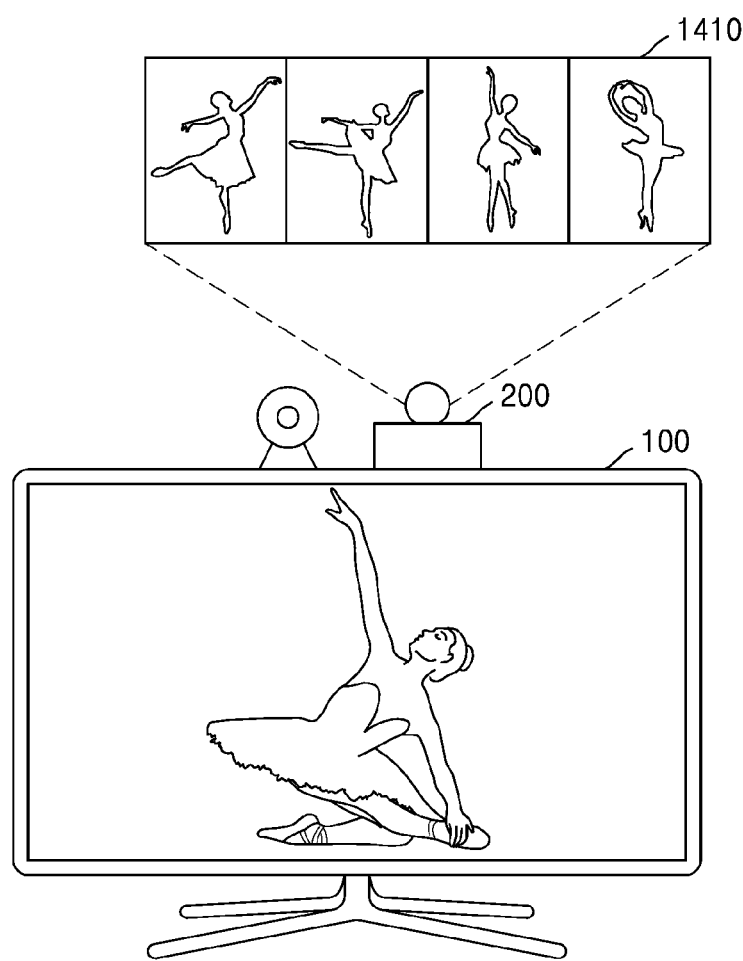
FIG. 14 is a diagram illustrating a method of providing second content when first content includes consecutive frames, according to an embodiment.

FIG. 14 is a diagram illustrating a method of providing second content when first content includes consecutive frames, according to an example embodiment.

Referring to FIG. 14, the display device 100 according to an embodiment may display a dance video including consecutive frames. The display device 100 may obtain information indicating that the first content includes the consecutive frames, by analyzing the first content.

When the display device 100 receives a rewind input several times greater than or equal to a preset number or a 'sequence view' input, then the display device 100 may transmit the trigger signal to the projector 200.

The display device 100 may extract representative frame images respectively representing a plurality of motions forming a dance from among a plurality of frame images included in the dance video. The display device 100 may generate a sequence image (e.g., the second content) including the representative frame images and transmit the sequence image to the projector 200.

The projector 200 may output a sequence image 1410 received from the display device 100.

Thus, the user may easily recognize a previous motion or a future motion while viewing the dance video through the display device 100.

Figure 15:
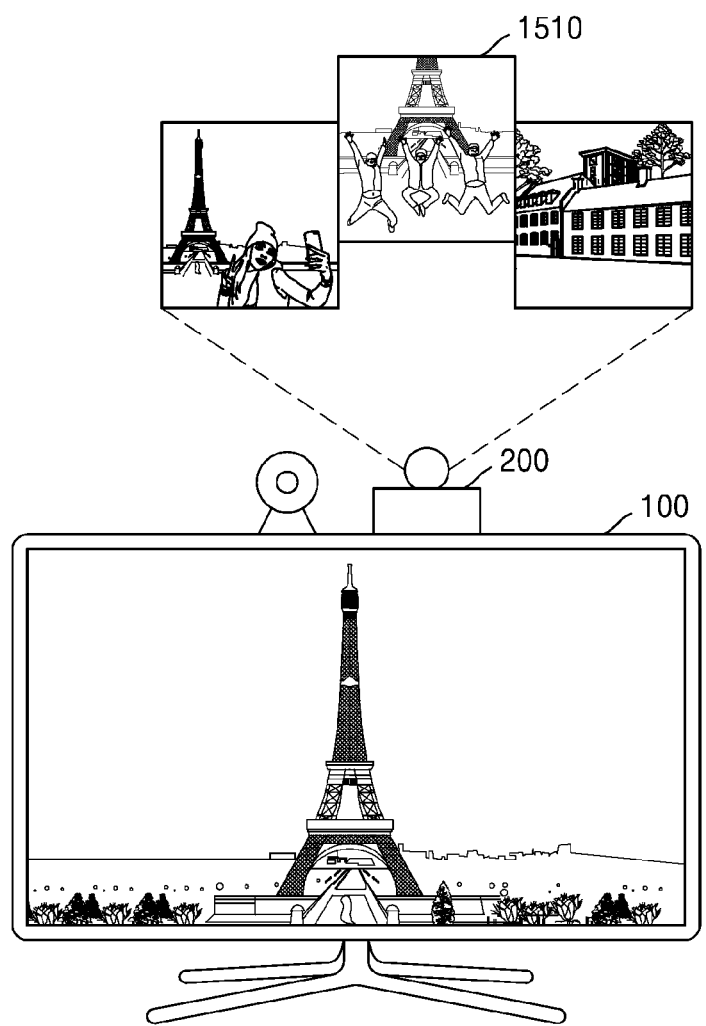
FIG. 15 is a diagram illustrating a method of providing second content related to first content displayed on a display device, according to an embodiment.

FIG. 15 is a diagram illustrating a method of providing second content related to first content displayed on a display device, according to an example embodiment.

Referring to FIG. 15, the display device 100 according to an embodiment may display first content. The display device 100 may obtain place information and background information related to the first content, object information included in the first content, etc., by analyzing the first content.

When the display device 100 receives an input to request related content from the user, the display device 100 may transmit the trigger signal to the projector 200.

The display device 100 may search for content related to the first content from among user's contents stored in the display device 100 or user's contents stored in a cloud server connected through a user account.

For example, when a place appearing in the first content is 'France', the display device 100 may search for photos taken by the user on the user's journey in France. The display device 100 may transmit the searched photos to the projector 200.

The projector 200 may output photos 1510 received from the display device 100 in a region that is separate from the display of the display device 100.

Figure 16:
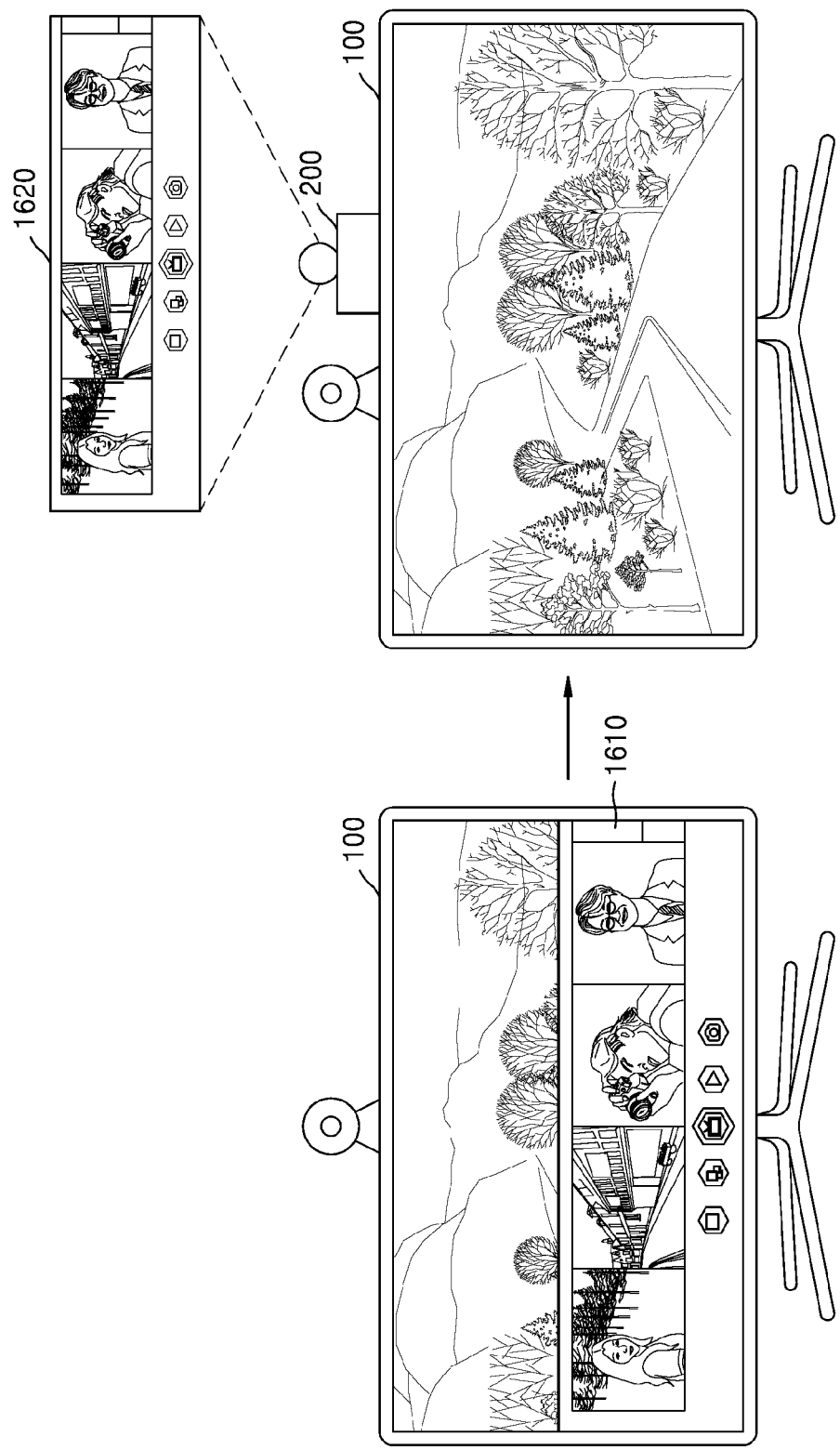
FIG. 16 is a diagram illustrating a method of providing second content when a menu screen is overlappingly displayed on first content displayed on a display device, according to an embodiment.

FIG. 16 is a diagram illustrating a method of providing second content when a menu screen is overlappingly displayed on first content displayed on a display device, according to an example embodiment.

Referring to FIG. 16, the display device 100 according to an embodiment may display first content including a menu screen 1610. By analyzing a layout of the currently displayed content, object information included in the first content, etc., the display device 100 may obtain information indicating that the first content includes the menu screen 1610. The menu screen 1610 according to an embodiment may include a plurality of items, a notification message, and icons. The menu screen 1610 may be displayed overlappingly on the first content, and as the menu screen 1610 is overlappingly displayed on the first content, a part of the first content may be covered with the menu screen 1610.

When the menu screen 1610 is detected from the first content, the display device 100 may transmit the trigger signal to the projector 200.

The display device 100 may extract the menu screen 1610 and generate second content. The display device 100 may transmit the extracted menu screen (e.g., the second content) to the projector 200. The projector 200 may output a menu screen 1620 received from the display device 100 that may display the first content on the entire screen of the display.

Figure 17:
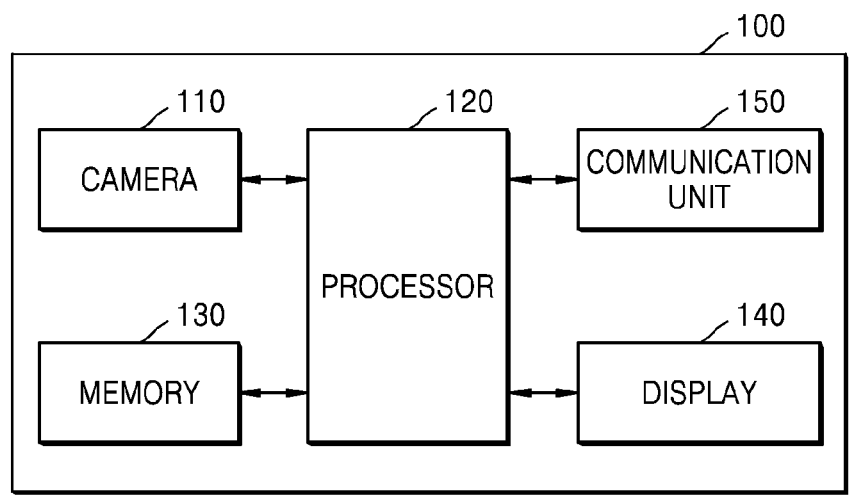
FIG. 17 is a diagram of a display device according to an embodiment.

FIG. 17 is a diagram of a display device according to an example embodiment.

Referring to FIG. 17, the display device 100 according to an embodiment may include a camera 110, a communication unit 150, a processor 120, a memory 130, and a display 140.

The camera 110 according to an embodiment may obtain an image frame like a still image, a moving image, etc., through an image sensor. For example, the camera 110 may receive an image corresponding to the user in a camera recognition range. A user image captured through the camera 110 may be processed through the processor 120 or a separate image processor, and the processor 120 may obtain user tracking information including user's position information and posture information, a user's gaze direction, etc., by analyzing the user image. The camera 110 may include two or more cameras according to a structural aspect of the display device 100.

The communication unit 150 according to an embodiment may transmit and receive data or a signal to or from an external device or a server under control of the processor 120. The processor 120 may transmit/receive content to/from an external device connected through the communication unit 150, download an application from the external device, or browse the web. The communication unit 150 may transmit and receive data or a signal by using at least one of a wireless local area network (WLAN) (e.g., Wireless Fidelity (Wi-Fi)), Bluetooth, or wired Ethernet, according to capability and structure of the display device 100.

For example, the communication unit 150 may transmit the trigger signal, the second content, the projection angle information, the position information of the region in which the second content is to be output, the screen configuration information of the display 140, the screen configuration information of the projector 200, etc., to the projector 200. However, embodiments of the disclosure are not limited thereto.

The processor 120 according to an embodiment may execute one or more programs stored in the memory 130. The processor 120 may include a single core, a dual core, a triple core, a quad core, and a core of a multiple thereof. The processor 120 may also include a plurality of processors. For example, the processor 120 may be implemented with a main processor and a sub processor which operates in a sleep mode.

The memory 130 according to an embodiment may store various data, programs, or applications for driving and controlling the display device 100.

The programs stored in the memory 130 may include one or more instructions. The programs (for example, one or more instructions) or applications stored in the memory 130 may be executed by the processor 120.

The processor 120 according to an embodiment may, by executing one or more instructions stored in the memory 130, obtain information about the first content by analyzing the first content displayed on the display 140. The processor 120 may include a content extraction module capable of extracting audio, video, an application, metadata, etc., included in the first content, an object detection module detecting an object included in the first content, a scene understanding module understanding a scene included in the first content, a region-of-interest detection module detecting a region of interest included in the first content, an audio analysis module analyzing audio included in the first content, a multimedia analysis module analyzing multimedia included in the first content, etc. However, embodiments of the disclosure are not limited thereto.

The processor 120 may obtain user tracking information including the number of users, a user's posture, a user's position, a user's gaze direction, etc., by tracking the user using the camera 110.

The processor 120 may determine whether a preset trigger condition is satisfied, based on at least one of the information about the first content or the user tracking information. The preset trigger condition has been described using a detailed example with reference to FIGS. 5 to 16, and thus the same description thereof will be omitted.

The processor 120 may control the communication unit 150 to transmit the trigger signal to the projector 200 when the preset trigger condition is satisfied.

The processor 120 may generate the second content based on the first content. For example, the processor 120 may generate the second content by composing, extracting, modifying, copying, etc., at least a part of the first content.

The processor 120 may include a composing module composing the second content, a recommendation module recommending the second content, a resolution module adjusting the resolution of the second content, a quality evaluation module evaluating the quality of the second content, an image processing module improving a video or image included in the second content, an audio processing module processing audio included in the second content, etc. However, embodiments of the disclosure are not limited thereto.

The processor 120 may control the communication unit 150 to transmit the generated second content to the projector 200.

The processor 120 may determine the projection angle information of the second content based on user tracking information. For example, the processor 120 may determine a position of a region in which the second content is to be output, based on the number of users, a user's posture, a user's position, and a user's gaze direction, and determine a projection angle to output the second content in the region.

The processor 120 may control the communication unit 150 to transmit the position information or projection angle information of the region in which the second content is to be output, to the projector 200.

The processor 120 may determine screen configuration information of the projector 200 based on screen configuration information of the display 140. For example, the processor 120 may obtain first screen configuration information including at least one of brightness information, resolution information, size information, color information, or contrast information of the display 140. The processor 120 may determine second screen configuration information of the projector 200 based on the first screen configuration information of the display 140.

The processor 120 may control the communication unit 150 to transmit the second screen configuration information to the projector 200.

The display 140 according to an embodiment may convert an image signal, a data signal, an on-screen display (OSD) signal, a control signal, or the like, processed by the processor 120, to generate a driving signal. The display 140 may be implemented with a plasma display panel (PDP), a liquid crystal display (LCD), an organic light-emitting diode (OLED), a flexible display, or the like, and may also be implemented with a three-dimensional (3D) display. The display 140 may include a touch screen and thus may be used as an input device as well as an output device.

The display device 140 according to an embodiment may display the first content.

Figure 18:
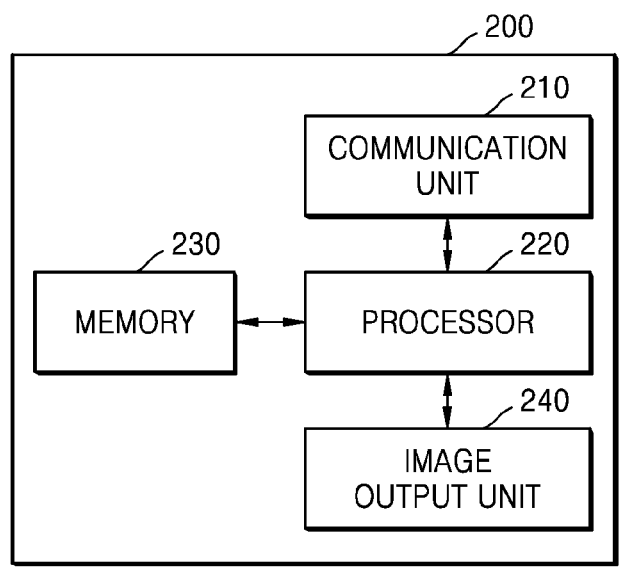
FIG. 18 is a diagram of a projector according to an embodiment.

FIG. 18 is a diagram of a projector according to an example embodiment.

Referring to FIG. 18, the projector 200 according to an embodiment may include a communication unit 210, a processor 220, a memory 230, and an image output unit 240.

The communication unit 210 according to an embodiment may transmit and receive data or a signal from or to an external device or a server under control of the processor 220. According to performance and structure of the projector 200, the communication unit 210 may include a Bluetooth Low Energy (BLE) communication unit, a near field communication (NFC) unit, a WLAN (WiFi) communication unit, a ZigBee communication unit, an infrared Data Association (IrDA) communication unit, a WiFi Direct (WFD) communication unit, an ultra-wideband (UWB) communication unit, an Ant+ communication unit, a microwave (uWave) communication unit, etc., without being limited thereto.

For example, the communication unit 210 may receive the trigger signal, the second content, the projection angle information, the position information of the region in which the second content is to be output, the screen configuration information of the display 140, the screen configuration information of the projector 200, etc., from the display device 100.

The projector 200 and the display device 100 according to an embodiment may be connected through wired communication such as a cable, etc., to transmit and receive a signal, data, etc.

The processor 220 according to an embodiment may store the second content received through the communication unit 210 in the memory 230 and output the stored second content through the image output unit 240.

The processor 220 according to an embodiment may also execute one or more programs stored in the memory 230. The memory 230 according to an embodiment may store various data, programs, or applications for driving and controlling the projector 200.

The programs stored in the memory 230 may include one or more instructions. The programs (for example, one or more instructions) or applications stored in the memory 230 may be executed by the processor 220.

The processor 220 according to an embodiment may, by executing one or more instructions stored in the memory 130, power on the projector 200 when receiving the trigger signal from the display device 100 or switch to the active state when being in the inactive state.

The projector 200 may adjust a projection angle based on projection angle information received from the display device 100. For example, the processor 200 may adjust a projection angle of the image output unit 240 based on the projection angle information. The image output unit 240 may be configured to be rotatable by 360 degrees.

The processor 220 may adjust an output screen configuration of the image output unit 240 based on screen configuration information of the projector 200 received from the display device 100.

Figure 19:
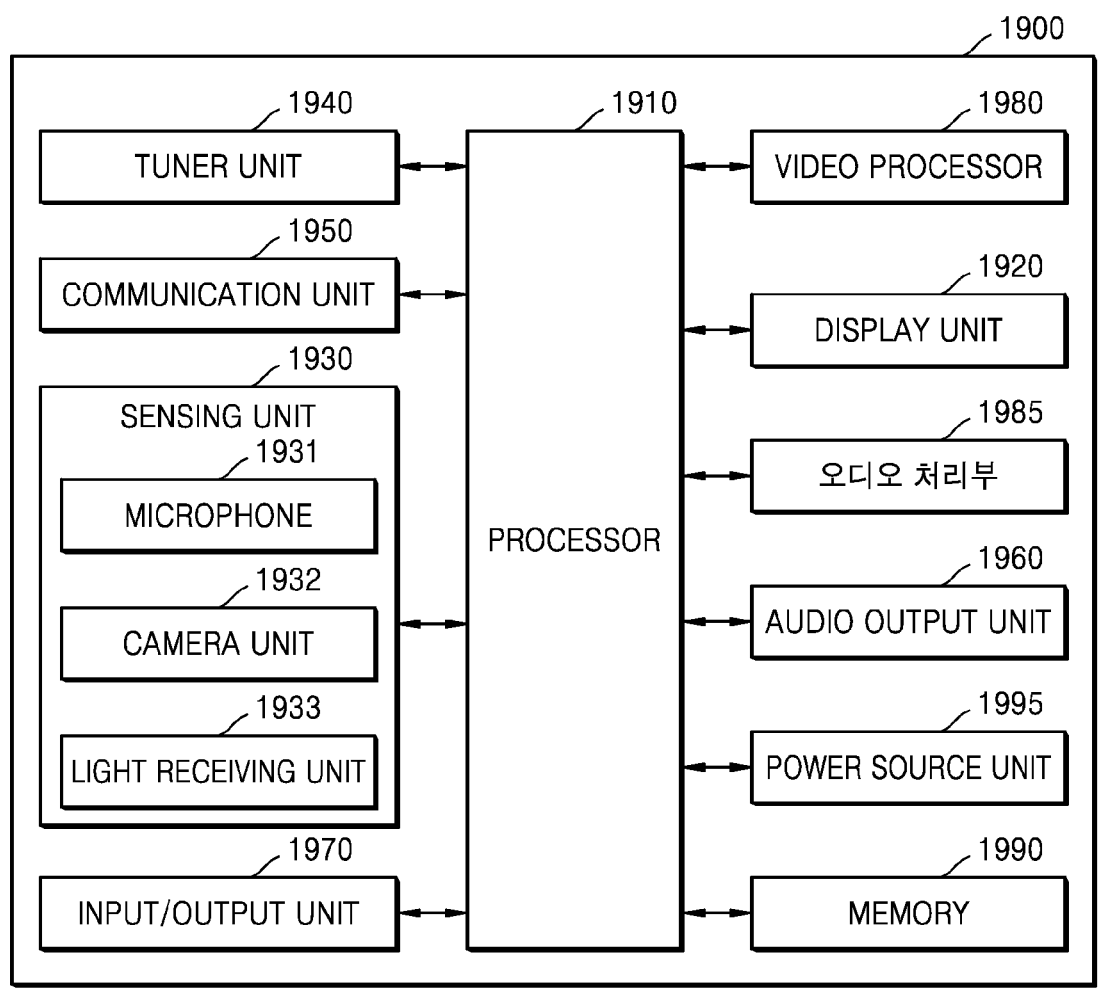
FIG. 19 is a diagram of a display device according to embodiment.

FIG. 19 is a diagram of a display device according to an example embodiment.

Referring to FIG. 19, a display device 1800 of FIG. 19 may be an embodiment of the display device 100 described with reference to FIGS. 1 to 17.

Referring to FIG. 19, the display device 1900 according to an embodiment may include a tuner unit 1940, a processor 1910, a display unit 1920, a communication unit 1950, a sensing unit 1930, an input/output unit 1970, a video processor 1980, an audio processor 1985, an audio output unit 1960, a memory 1990, and a power source unit 1995.

The camera unit 1932 of FIG. 19 may correspond to the camera 110 of FIG. 17, the communication unit 1950 of FIG. 19 may correspond to the communication unit 150 of FIG. 17, the processor 1910 of FIG. 19 may correspond to the processor 120 of FIG. 17, the memory 1990 of FIG. 19 may correspond to the memory 130 of FIG. 17, and the display unit 1920 of FIG. 19 may correspond to the display 140 of FIG. 17. Thus, the same description as made above will be omitted.

The tuner unit 1940 according to an embodiment may select a frequency of a channel the display device 1900 is to receive from among many electric wave components by tuning the frequency through amplification, mixing, resonance, or the like with respect to a broadcasting signal received wiredly or wirelessly. The broadcasting signal may include audio, video, and additional information (for example, an electronic program guide (EPG)).

The tuner unit 1940 may receive a broadcasting signal from various sources such as terrestrial broadcasting, cable broadcasting, satellite broadcasting, Internet broadcasting, and so forth. The tuner unit 1940 may receive a broadcasting signal from a source such as analog broadcasting, digital broadcasting, or the like.

The sensing unit 1930 may sense a user's voice, a user's image, or a user's interaction, and may include a microphone 1931, a camera unit 1932, and a light receiving unit 1933.

The microphone 1931 may receive an uttered voice of the user. The microphone 1931 may convert the received voice into an electric signal and output the electric signal to the processor 1910. The user's voice may include, for example, a voice corresponding to a menu or a function of the display device 1900.

The camera unit 1932 may receive an image (e.g., a continuous frame) corresponding to a user's motion including a gesture in a camera recognition range. The processor 1910 may select a menu displayed on the display apparatus 1900 by using a result of the recognition with respect to a received motion or perform control corresponding to the result of the recognition with respect to the received motion.

The light receiving unit 1933 may receive a light signal (including a control signal) received from an external control device through a lighting window of a bezel of the display unit 1920. The light receiving unit 1933 may receive a light signal corresponding to a user input (e.g., a touch, a press, a touch gesture, a voice, or a motion) from a control device. A control signal may be extracted from the received light signal under control of the processor 1910.

The input/output unit 1970 may receive video (e.g., moving images, etc.), audio (e.g., a voice, music, etc.), and additional information (e.g., an EPG, etc.) from the outside of the display device 1900. The input/output unit 1970 may include one of a high-definition multimedia interface (HDMI), a mobile high-definition link architecture (MHL), a universal serial bus (USB), a display port (DP), a Thunderbolt®, a video graphics array (VGA) port, an RGB port, a D-subminiature (D-SUB), a digital visual interface (DVI), a component jack, or a PC port.

The processor 1910 may control an overall operation of the display device 1900 and a signal flow among internal components of the display device 1900, and process data. The processor 1910 may execute an operating system (OS) and various applications stored in the memory 1990, when there is a user input or a preset and stored condition is satisfied.

The processor 1910 may include random access memory (RAM) that stores a signal or data input from the outside of the display device 1900 or is used as a storage region corresponding to various tasks performed in the display device 1900, read only memory (ROM) having stored therein a control program for controlling the display device 1900, and a processor.

The video processor 1980 may perform processing on video data received by the display device 1900. The video processor 1980 may perform various image processing, such as decoding, scaling, noise filtering, frame rate conversion, resolution conversion, etc., with respect to video data.

The display unit 1920 converts an image signal, a data signal, an OSD signal, a control signal, or the like, processed by the processor 1910, to generate a driving signal. The display unit 1920 may be implemented with a PDP, an LCD, an OLED, a flexible display, or the like, and may also be implemented with a 3D display. The display unit 1920 may include a touch screen and thus may be used as an input device as well as an output device.

The audio processor 1985 may process audio data. The audio processor 1985 may perform various processing such as decoding, amplification, noise filtering, etc., on the audio data. The audio processor 1985 may include a plurality of audio processing modules for processing audio corresponding to a plurality of contents.

The audio output unit 1960 may output audio included in a broadcasting signal received through the tuner unit 1940 under control of the processor 1910. The audio output unit 1960 may output audio (e.g., voice, sound, etc.) input through the communication unit 1950 or the input/output unit 1970. The audio output unit 1960 may output audio stored in the memory 1990 under control of the processor 1910. The audio output unit 1960 may include at least one of a speaker, a headphone output terminal, or a Sony/Phillips digital interface (S/PDIF) output terminal.

The power source unit 1995 may supply power, which is input from an external power source, to the internal elements of the display device 1900, under control of the processor 1910. The power source unit 1995 supplies power, which is output from one or more batteries included in the display device 1900, to the internal elements, under control of the processor 1910.

The memory 1990 may store various data, programs, or applications for driving and controlling the display device 1900 under control of the processor 1910. The memory 1990 may include a broadcasting reception module, a channel control module, a volume control module, a communication control module, a voice recognition module, a motion recognition module, a light reception module, a display control module, an audio control module, an external input control module, a power control module, a power control module of an external device connected wirelessly (for example, by Bluetooth), a voice database (DB), or a motion DB. Modules and DBs of the memory 1990 may be implemented in the form of software to perform a control function of broadcasting reception, a channel control function, a volume control function, a communication control function, a voice recognition function, a motion recognition function, a light reception control function, a power control function, or a power control function of an external device connected wirelessly (e.g., by Bluetooth) in the display device 1900. The processor 1810 may perform respective functions by using the foregoing software stored in the memory 1990.

The block diagrams of the display devices 100 and 1900 shown in FIGS. 17 and 19, respectively, may be block diagrams for an embodiment. Components of the block diagram may be integrated, added, or omitted depending on the specifications of the display devices 100 and 1900 implemented actually. That is, when necessary, two or more components may be integrated into one component or one component may be divided into two or more components. A function executed in each block is intended to describe embodiments of the disclosure, and a detailed operation or apparatus thereof does not limit the scope of the disclosure.

The operating method of the display device according to an embodiment may be implemented in the form of program commands that can be executed through various computer components and recorded in a non-transitory computer-readable recording medium. The computer-readable recording medium may include a program command, a data file, a data structure and the like solely or in a combined manner. The program command recorded in the computer-readable recording medium may be a program command specially designed and configured for the disclosure or a program command known to be used by those skilled in the art of the computer software field. Examples of the computer-readable recording medium may include magnetic media such as hard disk, floppy disk, and magnetic tape, optical media such as compact disk read only memory (CD-ROM) and digital versatile disk (DVD), magneto-optical media such as floptical disk, and a hardware device especially configured to store and execute a program command, such as ROM, RAM, flash memory, etc. Examples of the program command may include not only a machine language code created by a complier, but also a high-level language code executable by a computer using an interpreter.

The display device or the operating method thereof according to the disclosed embodiments may be included and provided in a computer program product. The computer program product may be traded as a product between a seller and a buyer.

The computer program product may include a software (S/W) program and a non-transitory computer-readable recording medium in which the S/W program is stored. For example, the computer program product may include a product (e.g., a downloadable application) in the form of a S/W program electronically distributed through a manufacturer or the electronic device or an electronic market (e.g., Google Play Store or App Store). For the electronic distribution, at least a portion of the S/W program may be stored in a storage medium or temporarily generated. In this case, the storage medium may be a storage medium of a server in the manufacturer, the electronic market, or a relay server that temporarily stores the S/W program.

The computer program product may include a storage medium of a server or a storage medium of a client device, in a system including the server and the client device. Alternatively, when there is a third device (e.g., a smart phone) communicating with the server or the client device, the computer program product may include a storage medium of the third device. Alternatively, the computer program product may include a S/W program itself, which is transmitted from the server to the client device or the third device or transmitted from the third device to the client device.

In this case, one of the server, the client device, and the third device may execute the computer program product to perform the method according to the example embodiments. Alternatively, two or more of the server, the client device, and the third device may execute the computer program product to execute the method according to the disclosed embodiments in a distributed manner.

For example, a server (e.g., a cloud server or AI server, etc.) may execute a computer program product stored in the server to control the client device communicating with the server to perform the method according to the disclosed embodiments.

At least one of the components, elements, modules or units (collectively "components" in this paragraph) represented by a block in the drawings, such as FIGS. 17-19, may be embodied as various numbers of hardware, software and/or firmware structures that execute respective functions described above. At least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like.

According to one or more embodiments, a display device may display first content and at the same time, control outputting of second content related to the first content through a projector, thereby providing an improved screen experience to a user.

According to one or more embodiments, the display device may display the first content on the entire screen without being disturbed by the second content.

According to one or more embodiments, the second content may be output at a position optimized for the user, thereby improving user convenience.

According to one or more embodiments, the first content displayed by the display device and the second content output by the projector may be provided at similar resolutions and quality, thus enhancing a user's viewing experience.

While example embodiments have been shown and described, the scope of the disclosure is not limited to the description and also includes various modifications and improvements made by those of ordinary skill in the art using the concept of the disclosure defined in the appended claims.

What is claimed is:

1. A display device comprising:
a display configured to display first content;
a memory storing instructions; and
a processor configured to execute the instructions to:
obtain first content information by analyzing the first content,
obtain user tracking information by tracking a user viewing the first content displayed by the display, the user tracking information comprising position information of the user, determine whether a trigger condition is satisfied, based on at least one of the first content information and the user tracking information, and based on the trigger condition being satisfied, control a communication unit to transmit second content to a projector connected to the display device, wherein the second content is generated based on the first content, wherein the trigger condition comprises the user tracking information indicating that a gaze of the user has changed from a first gaze in a first direction that is directed toward the display to a second gaze in a second direction that is directed away from the display, wherein, based on the trigger condition being satisfied, the processor is configured to execute the instructions to control the communication unit to transmit the position information of the user and projection angle information to the projector, and wherein, based on receiving the position information and the projection angle information from the communication unit, the projector is configured to output the second content at a region corresponding to the second gaze.

2. The display device of claim 1, wherein the processor is further configured to execute the instructions to, based on the trigger condition being satisfied, control the communication unit to transmit a trigger signal to the projector, and wherein the trigger signal comprises a first signal for powering on the projector or a second signal for switching the projector to an active state.

3. The display device of claim 1, wherein the user tracking information further comprises at least one of a number of users, and a posture of the user.

4. The display device of claim 1, wherein the projector is configured to be rotatable by 360 degrees.

5. The display device of claim 1, wherein the processor is further configured to execute the instructions to generate the second content by:

performing at least one of extracting, copying, modifying, or composing at least partial content included in the first content, or recommending content related to the first content as the second content.

6. The display device of claim 1, wherein the first content information comprises at least one of type information of the first content, genre information of the first content, object information included in the first content, or metadata regarding the first content.

7. The display device of claim 1, further comprising a camera, wherein the processor is further configured to execute the instructions to control the camera to track the user.

8. The display device of claim 1, wherein the processor is further configured to execute the instructions to:

obtain screen configuration information of the display, the screen configuration information of the display comprising at least one of brightness information, resolution information, size information, color information, or contrast information of the display, determine screen configuration information of the projector based on the screen configuration information of the display, and control the communication unit to transmit the screen configuration information of the projector to the projector.

9. The display device of claim 8, wherein the second content is projected based on the screen configuration information of the projector.

10. An method operating of a display device, the method comprising:

displaying first content on a display of the display device;

obtaining first content information by analyzing the first content;

obtaining user tracking information by tracking a user viewing the first content that is displayed, the user tracking information comprising position information of the user;

determining whether a trigger condition is satisfied, based on at least one of the first content information and the user tracking information; and based on the trigger condition being satisfied, transmitting second content generated to a projector connected to the display device, wherein the second content is generated based on the first content, wherein the trigger condition comprises the user tracking information indicating that a gaze of the user has changed from a first gaze in a first direction that is directed toward the display to a second gaze in a second direction that is directed away from the display, and wherein the method further comprises:

based on the trigger condition being satisfied, transmitting the position information of the user and projection angle information to the projector, and based on receiving the position information and the projection angle information, outputting, by the projector, the second content at a region corresponding to the second gaze.

11. The method of claim 10, further comprising transmitting a trigger signal to the projector based on the trigger condition being satisfied, wherein the trigger signal comprises a signal for powering on the projector or a signal for switching the projector to an active state.

12. The method of claim 10, wherein the obtaining of the user tracking information comprises obtaining at least one of a number of users, and a posture of the user by tracking the user viewing the first content.

13. A non-transitory computer-readable storage medium storing instructions that are executable by a processor to perform a method of operating a display, the method comprising:

displaying first content on a display of a display device;

obtaining first content information by analyzing the first content;

obtaining user tracking information by tracking a user viewing the first content that is displayed, the user tracking information comprising position information of the user;

determining whether a trigger condition is satisfied, based on at least one of the first content information and the user tracking information; and based on the trigger condition being satisfied, transmitting second content generated to a projector connected to the display device, wherein the second content is generated based on the first content, wherein the trigger condition comprises the user tracking information indicating that a gaze of the user has changed from a first gaze in a first direction that is directed toward the display to a second gaze in a second direction that is directed away from the display, and wherein the method further comprises:
- based on the trigger condition being satisfied, transmitting the position information of the user and projection angle information to the projector, and
- based on receiving the position information and the projection angle information, outputting, by the projector, the second content at a region corresponding to the second gaze.

14. The non-transitory computer-readable storage medium of claim 13, wherein the method further comprises, based on the trigger condition being satisfied, transmitting a trigger signal to the projector, and
- wherein the trigger signal comprises a first signal for powering on the projector or a second signal for switching the projector to an active state.

15. The non-transitory computer-readable storage medium of claim 13, wherein the obtaining of the user tracking information comprises obtaining at least one of a number of users, and a posture of the user by tracking the user viewing the first content.

\* \* \* \* \*